United States Patent
Hamada et al.

(10) Patent No.: US 6,831,884 B2
(45) Date of Patent: Dec. 14, 2004

(54) CLOCK ADJUSTING DEVICE FOR USE WITH DATA REPRODUCING APPARATUS, OFFSET DETECTING DEVICE, AND DATA REPRODUCING APPARATUS

(75) Inventors: Kenichi Hamada, Kato (JP); Satoshi Furuta, Kato (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 456 days.

(21) Appl. No.: 09/991,780

(22) Filed: Nov. 26, 2001

(65) Prior Publication Data

US 2002/0181360 A1 Dec. 5, 2002

(30) Foreign Application Priority Data

May 31, 2001 (JP) ........................................ 2001-165589

(51) Int. Cl.[7] .............................................. G11B 7/005
(52) U.S. Cl. ................. 369/47.28; 369/47.35; 369/59.22
(58) Field of Search .......................... 369/47.28, 47.35, 369/59.22, 53.34, 59.15

(56) References Cited

U.S. PATENT DOCUMENTS

| | | | | |
|---|---|---|---|---|
| 4,872,155 A | * | 10/1989 | Yokogawa et al. | 369/47.28 |
| 4,945,538 A | * | 7/1990 | Patel | 714/786 |
| 5,638,065 A | * | 6/1997 | Hassner et al. | 341/59 |
| 5,675,565 A | * | 10/1997 | Taguchi et al. | 369/47.35 |
| 5,682,374 A | * | 10/1997 | Horigome et al. | 369/275.3 |
| 6,603,419 B2 | * | 8/2003 | Nanba et al. | 341/155 |

FOREIGN PATENT DOCUMENTS

JP           9-247136 A          9/1997

* cited by examiner

Primary Examiner—Hoa T. Nguyen
Assistant Examiner—Peter Vincent Agustin
(74) Attorney, Agent, or Firm—Arent Fox, PLLC

(57) ABSTRACT

In a data reproducing apparatus, a monitor edge sample value is generated based on a second sample value at a trailing edge of the reproduction signal and a change amount of the monitor edge sample value is generated as an offset amount in a first processing part. Then, the offset amount is supplied to a second processing part where the second sample value is obtained by sampling the reproduction signal at the trailing edge. Then, the second processing part restores data based on the reproduction signal and the offset amount.

13 Claims, 19 Drawing Sheets

SAMPLING IN CASE OF LOCKING TO LEADING EDGE

SAMPLING IN CASE OF LOCKING TO TRAILING EDGE

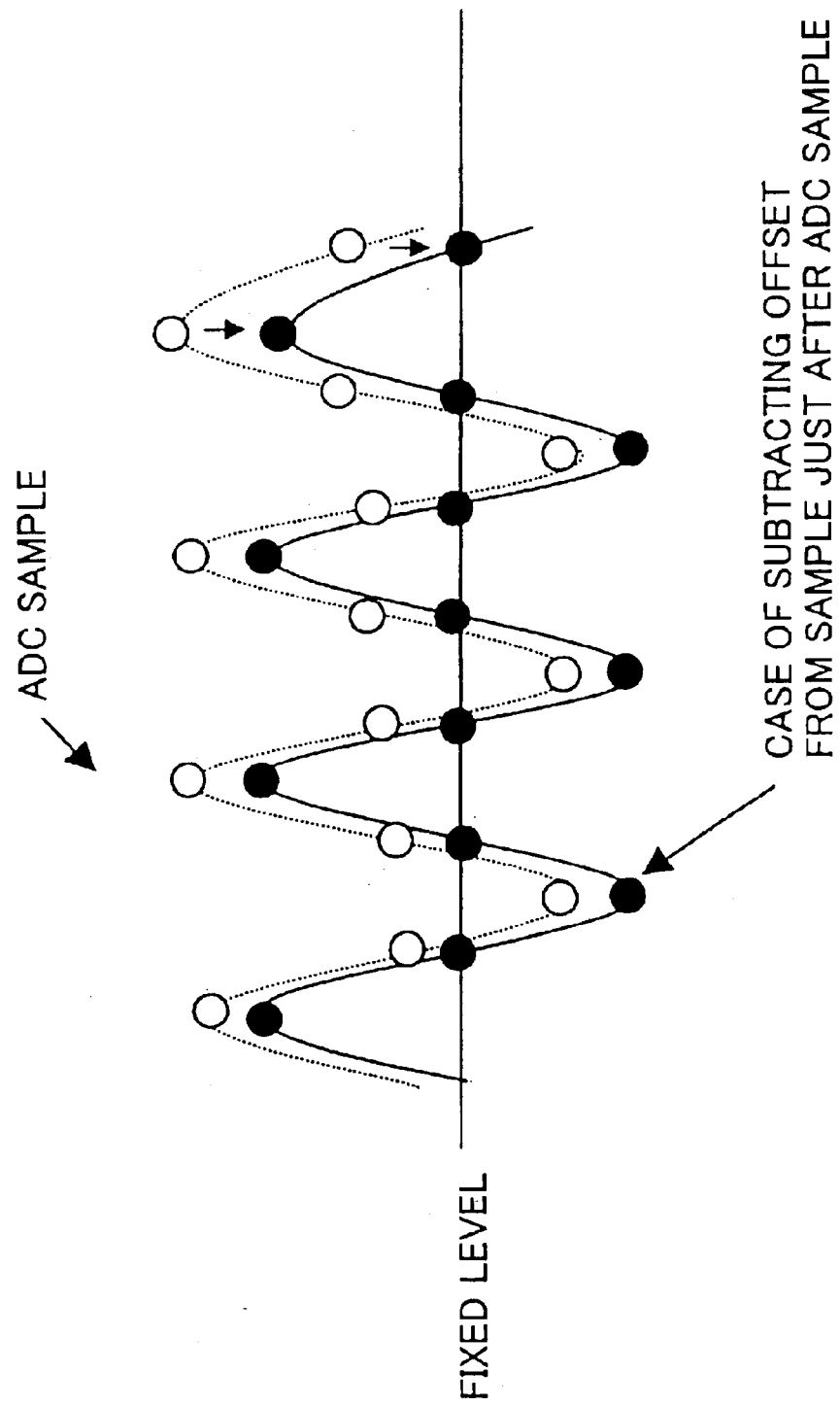

CLOCK ADJUSTING DEVICE FOR USE WITH DATA REPRODUCING APPARATUS, OFFSET DETECTING DEVICE, AND DATA REPRODUCING APPARATUS

BACKGROUND OF THE INVENTION

1. Field of the Invention

The present invention generally relates to a clock adjusting device for use with a data reproducing apparatus and for an optical disc device, a magneto-optical disc device and the data reproducing apparatus, and more particularly to the clock adjusting device for adjusting a phase of a clock used for the data reproducing apparatus that samples a reproduction signal from a recording medium synchronizing with a predetermined clock and restores record data based on a sample value.

Moreover, the present invention relates to an offset detecting device that can be used for such the clock adjusting device.

Furthermore, the present invention relates to the data reproducing apparatus in which such the offset detecting device is applied.

2. Description of the Related Art

In recent years, a recording medium, for example, a magneto-optical disc has been improved in high density of recording information, and improvement in a transmission rate of data in a reproduction system of the magneto-optical disc is also attempted. Thus, a record reproduction method of PRML (Partial Response Maximum Likelihood) is proposed as an approach of reproducing information at high speed and with high accuracy from the magneto-optical disc in which the information is recorded at high density.

In the record reproduction method of this PRML, data to be recorded is written on the magneto-optical disc by a signal of a partial response (PR) waveform. And the data is sampled a reproduction signal from the magneto-optical disc synchronizing with a predetermined clock and in accordance with a maximum-likelihood (ML) decode algorithm (for example, Viterbi decode algorithm), probable data is restored from a sample value.

In the data reproducing apparatus (for example, optical disc device) on condition of the above-mentioned record reproduction approach of PRML, the reproduction signal from a recording medium, for example, it is necessary to sample a magneto-optical disc synchronizing with the clock and to adjust the phase of the clock so that a sample value turns into a value by which a partial response waveform is characterized. For example, in a case of PR(1,1) waveform, the sample value becomes a peak value (2), a center value (1), or a bottom value (0).

The clock adjusting device known from the former converts a reproduction signal into two values by predetermined slice level and adjusts the phase of the clock so that the phase of the clock synchronizes with a rising edge (leading edge) or falling edge (trailing edge) of the two-value signal by a PLL (Phase-locked loop) circuit. By such a phase adjustment device, the phase of the clock is adjusted so as to synchronize with the rising edge or falling edge of the reproduction signal.

In the above-mentioned phase adjustment of clock signals, a phase error amount of the clock is calculated based on a relationship between a reproduction signal and a clock (for example, a relationship between the phase of the rising edge of the reproduction signal and the phase of the clock), and the phase of the clock is adjusted so that the phase error amount is eliminated. Accordingly, if there is a local skew in the reproduction signal or a level fluctuation (envelope fluctuation) in the over all reproduction signal, a stable phase adjustment cannot be realized.

SUMMARY OF THE INVENTION

It is a general object of the present invention to provide a clock adjusting device for use with a data reproducing apparatus and for optical disc devices, a magneto-optical disc device and the data reproducing apparatus in which the above-mentioned problems are eliminated.

A first specific object of the present invention is to provide the clock adjusting device that can perform stable phase adjustment.

A second specific object of the present invention is to provide an offset detecting device that can be used for such the clock adjusting device.

A third specific object of the present invention is to provide the data reproducing apparatus in which the offset detecting device is applied.

The above first object of the present invention is achieved by a clock adjusting device for use with a data reproducing apparatus for a reproduction signal from a recording medium is sampled synchronizing with a predetermined clock and data is restored in accordance with a maximum-likelihood decode algorithm corresponding to a record rule of a partial response using a sample value, the clock adjusting device including: a phase error detecting part detecting a phase error amount of a clock based on a state of the sample value at a first edge of the reproduction signal on a basis of a reference level; an offset detecting part detecting an offset amount of the reproduction signal; a reference level adjusting part adjusting the reference level used by the phase error amount detecting part based on the offset amount detected by the offset detecting part; and a phase adjusting part adjusting a phase of the clock based on the phase error amount detected by the phase error detecting part, wherein the offset detecting part includes: a monitor sample value generating part generating a monitor edge sample value based on the sample value at a second edge being an opposite side edge to the first edge of the reproduction signal; and an offset calculating part for calculating, as an offset amount, a change amount of the monitor edge sample value generated by the monitor sample value generating part based on the monitor edge sample value obtained at a predetermined timing.

In the clock adjusting device, since the reference level in the phase error detecting part is adjusted based on the offset amount even if it fluctuates the overall level of the reproduction signal, the more proper amount of phase errors can be obtained.

Moreover, the offset amount is calculated based on the change of the monitor edge sample value generated based on the sample value. Therefore, it is possible to obtain the offset amount by digital process.

The monitor edge sample value may be the sample value itself. Alternatively, the monitor edge sample value may be a rough level of a plurality of sample values. From a viewpoint that the offset value is not influenced by a rapid fluctuation of the sample value, it is desirable that the monitor edge sample value indicates a rough level of the plurality of sample values, such as an average value of those sample values.

Moreover, the above first object of the present invention is achieved by the clock adjusting device, wherein the first edge is a leading edge of the reproduction signal, and the second edge is a trailing edge of the reproduction signal.

From a viewpoint that a stable phase adjustment can be conducted form an earlier stage of a phase adjustment, in which stage the phase of the clock is greatly shifted, the above first object of the present invention is achieved by the clock adjusting device further including: a part detecting the phase error amount based on the change state of a plurality of sample values; and a phase error switching control part controlling the phase adjusting part so that the phase of the clock is adjusted based on the phase error amount obtained by the phase error detecting part after the phase of the clock is adjusted based on the phase error amount detected by the part.

The above second object of the present invention is achieved by an offset detecting device for detecting an offset of a reproduction signal in a data reproducing apparatus that the reproduction signal from a recording medium is sampled synchronizing with a predetermined clock and data is restored using a sample value in accordance with a maximum-likelihood decode algorithm corresponding to a record rule of a partial response, the offset detecting device including: a monitor sample value generating part for generating a monitor edge sample value based on the sample value at a second edge being an opposite side edge of a first edge of the reproduction signal when the reproduction signal is sampled synchronizing with the clock which phase is adjusted to the first edge of the reproduction signal; and an offset calculating part calculating, as an offset amount of a reproduction signal, a change amount of the monitor edge sample value generated by the sample value generating part on a basis of the monitor edge sample value obtained at a predetermined timing.

The above third object of the present invention is achieved by an apparatus for reproducing data, including: a first processing part sampling a reproduction signal synchronizing with a first clock which phase is adjusted to a first edge of said reproduction signal from a recording medium, and restoring data in accordance with a maximum-likelihood decode algorithm corresponding to a record rule of a partial response by using a first sample value; and a second processing part sampling said reproduction signal synchronizing with a second clock which phase is adjusted to a second edge being an opposite side edge of said first edge of said reproduction signal, and restoring data in accordance with said maximum-likelihood decode algorithm by using a second sample value, wherein said first processing part includes: a monitor sample value generating part generating a monitor edge sample value based on said second sample value at said second edge of said reproduction signal; an offset calculating part calculating, as an offset amount, a change amount of said monitor edge sample value generated by said sample value generating part based on said monitor edge sample value obtained at a predetermined timing; and a part supplying said offset amount obtained by said offset calculating part to said second processing part, so that said first processing part and said second processing part restore data based on said reproduction signal and said offset amount.

BRIEF DESCRIPTION OF THE DRAWINGS

Other objects, features and advantages of the present invention will become more apparent from the following detailed description when read in conjunction with the accompanying drawings, in which:

FIG. 19 is a diagram showing a state in which the offset of the sample value is adjusted.

DESCRIPTION OF THE PREFERRED EMBODIMENTS

An embodiment of the present invention will now be described with reference to figures.

Figure 1:
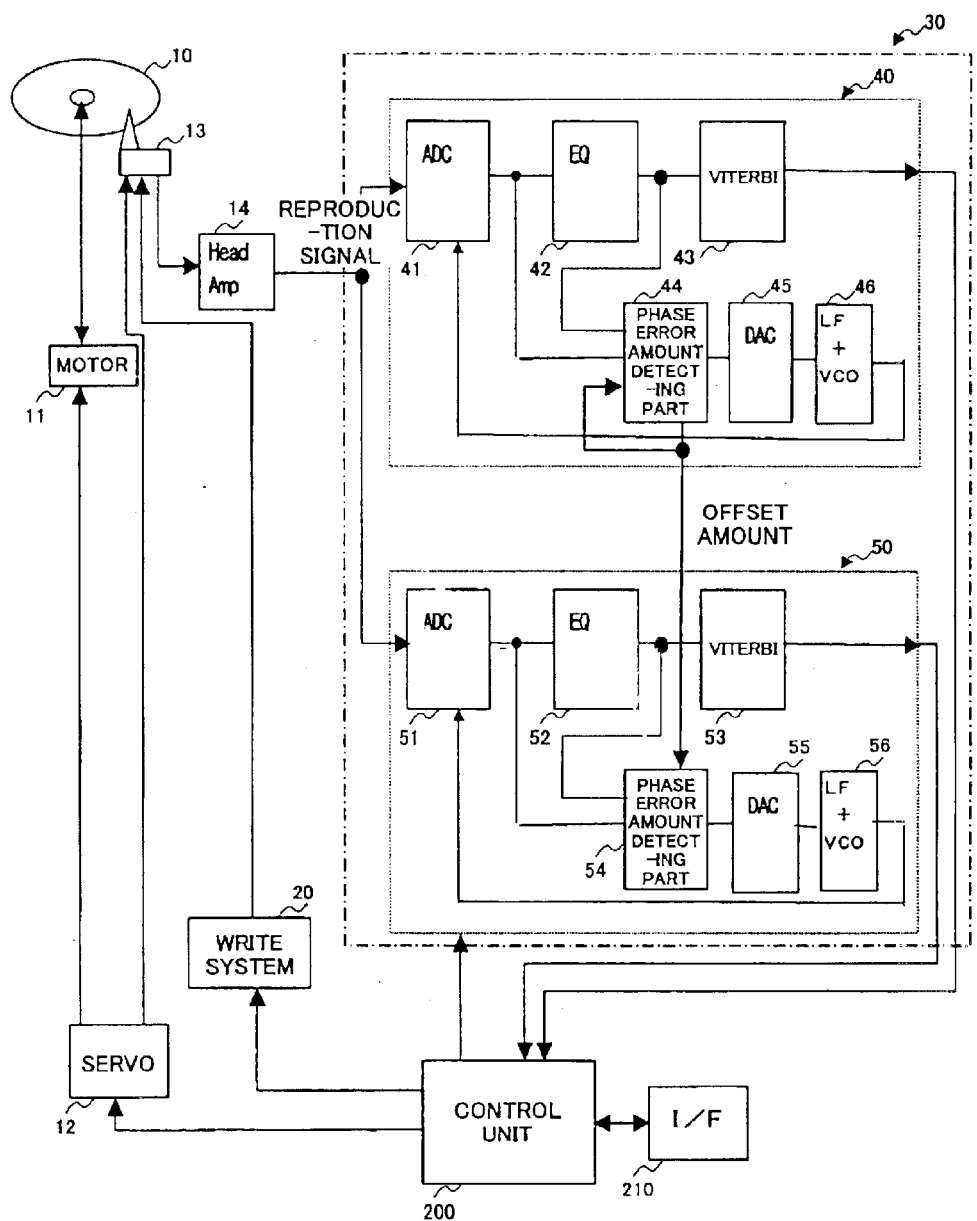
FIG. 1 is a diagram showing a configuration of a data reproducing apparatus in which a clock adjusting device is applied according to an embodiment of the present invention.

A data reproducing apparatus according to embodiment of the present invention, in which a clock adjusting device is applied, is configured as shown in FIG. 1. In this example, a case of an optical disc device using a magneto-optical disc as a recording medium is shown in FIG. 1.

In FIG. 1, the optical disc device includes a magneto-optical disc 10 used as a recording medium, a motor 11 to rotate the magneto-optical disc 10, and a servo circuit 12 that performs a drive control of the motor 11. Moreover, the optical disc device includes an optical head 13, a head amplifier 14, a write system 20, a read system 30, a control unit 200, and an interface circuit 210.

The control unit 200 controls the servo circuit 12, the write system 20, and the read system 30. In detail, the control unit 200 supplies a drive control signal to the servo circuit 12 so that the magneto-optical disc 10 rotates at constant speed, and the servo circuit 12 makes the motor 11 driven based on the drive control signal. Moreover, the control unit 200 supplies the data that is input through the interface circuit 210 from external units (PC and the like), to the write system 20. And data is recorded on the magneto-optical disc 10 by the write system 20 controlling the optical head 13 based on the data.

Furthermore, under a control by the control unit 200, the read system 30 inputs the signal, which is read from the magneto-optical disc 10 by he optical head 13, as a reproduction signal through the head amplifier 14, and restores record data based on the reproduction signal. The data obtained by the read system 30 is supplied to the control unit 200, and is further supplied to an external unit through the interface circuit 210 from the control unit.

The above-mentioned read system 30 includes a leading edge processing part 40 and a trailing edge processing part 50. The leading edge processing part 40 samples a reproduction signal by synchronizing with a clock that synchronizes with a leading edge of the reproduction signal, and restores record data based on a sample value. The trailing edge processing part 50 samples a reproduction signal by synchronizing with the clock that synchronizes with a trailing edge of the reproduction signal, and restores record data based on a sample value.

The above-mentioned leading edge processing part 40 includes an analog-to-digital conversion circuit (hereinafter called ADC) 41, an equalizer (hereinafter called EQ) 42, a Viterbi decoder 43, the phase error amount detecting part 44, a digital-to-analog conversion circuit (hereinafter called DAC) 45, and a phase adjustment oscillation unit 46. Moreover, the trailing edge processing part 50 as well as the above-mentioned leading edge processing part 40 includes an ADC 51, an EQ 52, a Viterbi decoder 53, a phase error amount detecting part 54, a DAC 55, and a phase adjustment oscillation unit 56.

The ADCs 41 and 51 perform a conversion operation by synchronizing with the clock from the phase adjustment oscillation units 46 and 56, and outputs the value obtained by the conversion operation as a sample value. Equalizers 42 and 52 perform a digital equalizing process to the sample value from the ADCs 41 and 51, respectively. The Viterbi decoders 43 and 53 process the sample value supplied through equalizers 42 and 52 in accordance with a Viterbi decoding algorithm, and restore the maximum likelihood data as record data.

The phase error amount detecting part 44 sequentially inputs respective each sample value of the ADC 41 and the EQ 42 and detects an amount of phase error on a basis of the leading edge of the reproduction signal as described later by using one of the sample values. Also, the phase error amount detecting part 54 sequentially inputs each sample value of the ADC 41 and the EQ 42 and detects an amount of phase error on a basis of the trailing edge of the reproduction signal by using one of the sample values. The phase error amount of the clock detected by each of phase error amount detecting parts 44 and 54 is changed into a voltage level (analog value) by each of the DACs 45 and 55. Each of the phase adjustment oscillation units 46 and 56 includes a loop filter (LF) and a voltage control oscillator (VCO), and adjusts a phase of a predetermined oscillation clock so as to reduce each phase error amount by the voltage level corresponding to each phase error amount from the DACs 45 and 55. The clock, which phase is adjusted so as to synchronize with the leading edge of the reproduction signal in the phase adjustment oscillation unit 46, is supplied to the ADC 41, which samples the reproduction signal as described above. Also, the clock, which phase is adjusted so as to synchronize with the trailing edge of the reproduction signal in the phase adjustment oscillation unit 56, is supplied to the ADC 51, which samples the reproduction signal.

The phase error amount detecting part 44 of the above-mentioned leading edge processing part 40 detects an offset amount of the reproduction signal as described later. The offset amount is used for a process in the phase error amount detecting part 44 and also is supplied to the phase error amount detecting part 54 of the trailing edge processing part 50 from the phase error amount detecting part 44. The phase error amount detecting part 54 of the trailing edge processing part 50 processes using the offset amount supplied.

The above-mentioned offset amount expresses fluctuation (envelope fluctuation) of an overall level of the reproduction signal and each of the phase error amount detecting parts 44 and 54 can perform a stable phase error detection, even if overall level fluctuation of the reproduction signal occurs by processing using the offset amount.

Figure 2:
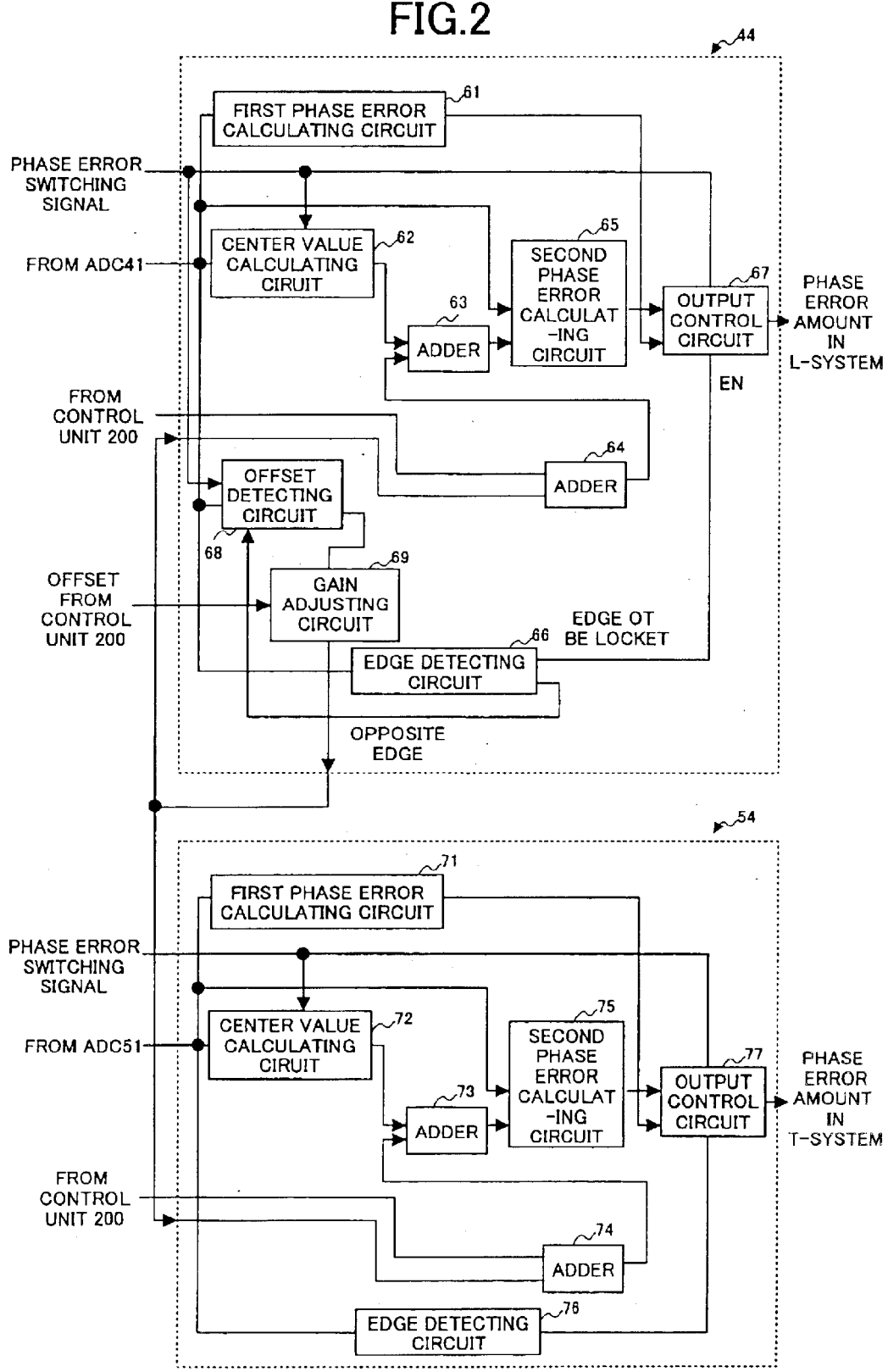
FIG. 2 is a diagram showing a configuration example of each of phase error amount detecting parts in the data reproducing apparatus shown in FIG. 1.

The phase error amount detecting parts 44 and 54 of the leading edge processing part 40 and the trailing edge processing part 50 are configured as shown in FIG. 2.

In FIG. 2, the phase error amount detecting part 44 of the leading edge processing part 40 includes a first phase error calculating circuit 61, a center value calculating circuit 62, adders 63 and 64, a second phase error calculating circuit 65, an edge detecting circuit 66, an output control circuit 67, an offset detecting circuit 68, and a gain adjusting circuit 69.

Figure 3:
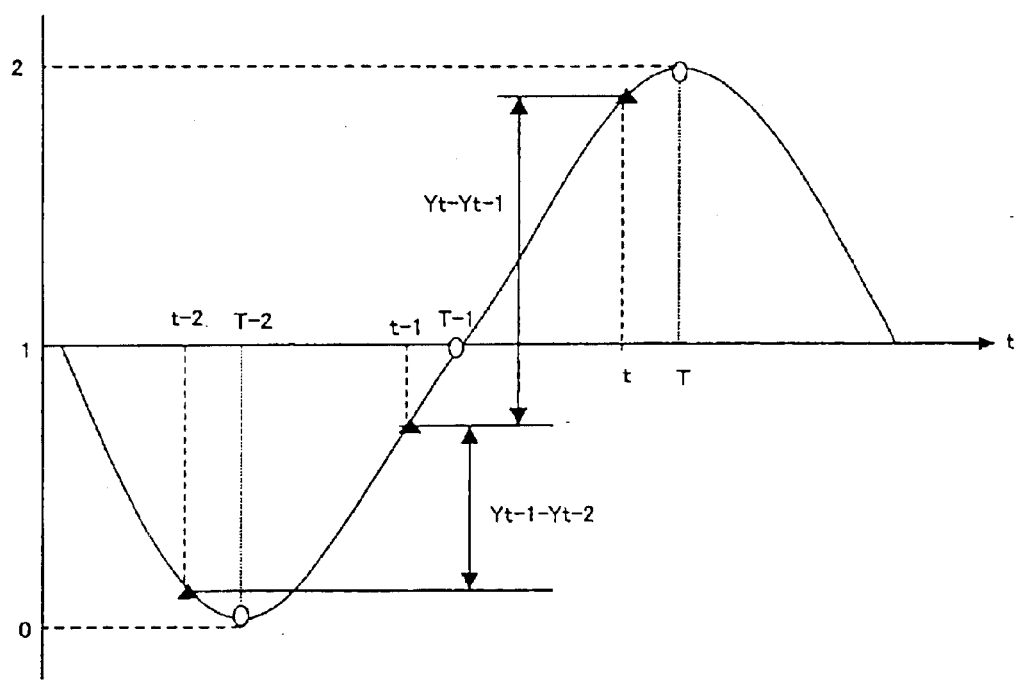
FIG. 3 is a diagram showing a principle for calculating a phase error amount from a fluctuation state of a plurality of sample values.

The first phase error calculating circuit 61 calculates the phase error amount of the clock that decides a sample timing of the reproduction signal based on the state of a plurality of successive sample values (for example, three sample values) supplied from the ADC 41. For example, when the reproduction signal becomes a 2T pattern (repetition of a peak value (2), a main value (1), and a bottom value (0)) of PR(1,1) waveform, as it is shown in FIG. 3, the phase error amount can be calculated based on a difference $(Y_{t-1}-Y_{t-2})$ between two preceding values $Y_{t-2}$ and $Y_{t-1}$ and a difference $(Y_{t-1}-Y_t)$ between two following values $Y_{t-1}$ and $Y_t$ as follows:

phase error amount=$(Yt1-Yt-2) \times H1-(Yt-1) \times H2$ phase error amount = $(Yt-1-Yt-2) \times H1 - (Yt-Yt-1) \times H2$ $H1 = +1$ (in case of $Y_t - Y_{t-1} > 0$)
$= 0$ (in case of $Y_t - Y_{t-1} = 0$)
$= -1$ (in the case of $Y_t - Y_{t-1} < 0$)
$H2 = +1$ (in the case of $Y_{t-1} - Y_{t-2} > 0$)
$= 0$ (in the case of $Y_{t-1} - Y_{t-2} = 0$)
$= -1$ (in the case of $Y_{t-1} - Y_{t-2} < 0$)

For example, in a case in which the clock is of a phase (T, T–1, T–2) that is originally sampled (state of the phase lock), a sample value can be a value indicated by a mark "○" (white round) in FIG. 3 and then, the phase (T, T–1, T–2) can be expressed as follows:

$(Y_{t-1}-Y_{t-2})=(Y_T-Y_{T-1})$, and the phase error amount becomes zero. On the other hand, when a sample value in which the clock is of a phase (t, t–1, t–2) is obtained like "▲" (black triangle) mark shown in FIG. 3, the phase (t, t–1, t–2) can be expressed as follows:

$Y_{t-1} - Y_{t-2} > 0 \rightarrow H2 = +1$ $Y_t - Y_{t-1} > 0 \rightarrow H1 = +1$ $|Y_{t-1} - Y_{t-2}| < |Y_t - Y_{t-1}|$ and then the phase error amount is expressed as follows:

$(Y_{t-1} - Y_{t-2}) < (Y_t - Y_{t-1})$.

The phase error amount becomes a negative value, and the clock ends up advancing by the absolute value of the phase error amount.

The center value calculating circuit 62 calculates a fixed center value of the reproduction signal, which value is used in the second phase error calculating circuit 65. The fixed center value is obtained by averaging the sample value input, for example, in a predetermined period. The center value defined based on a feature of a waveform of the reproduction signal can also be used as the fixed center value.

Figure 4:
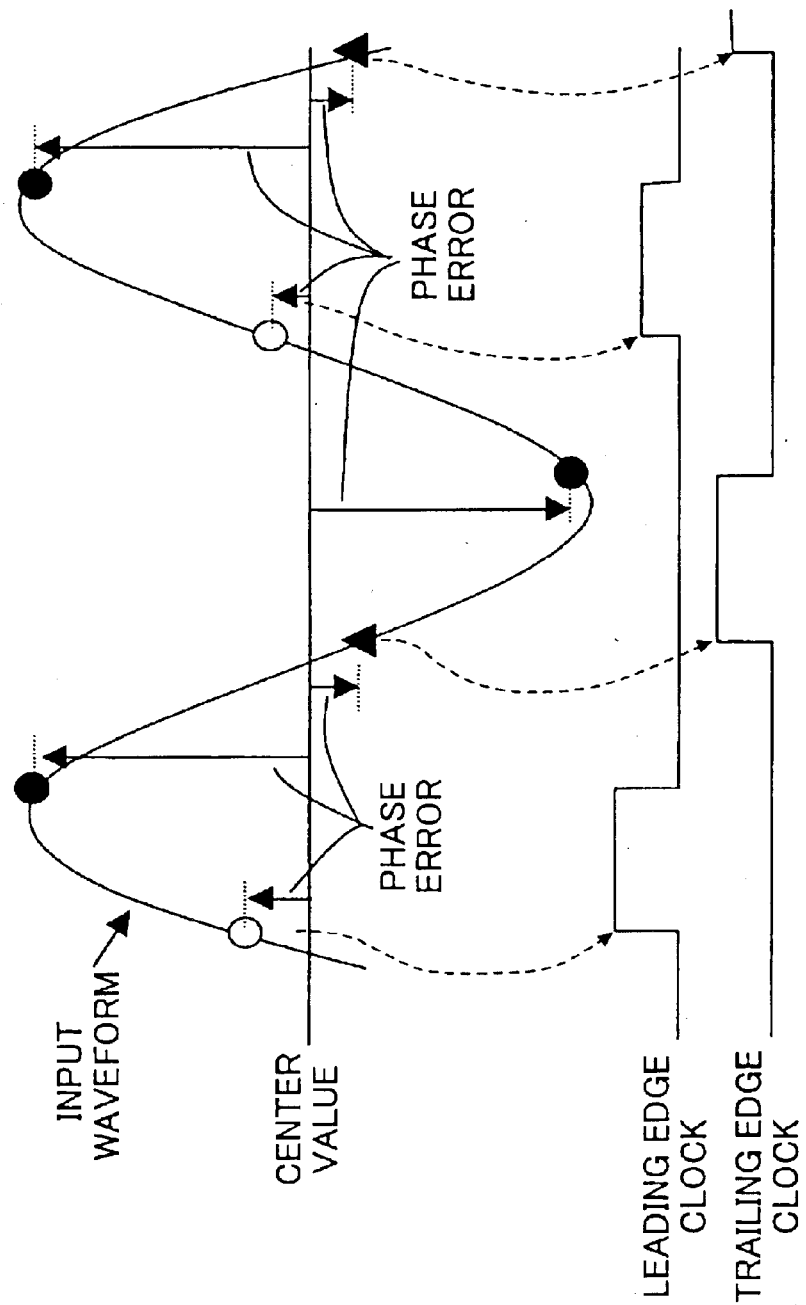
FIG. 4 is a diagram showing a principle for calculating the phase error amount from a difference between sample values on a basis of a center value of a reproduction signal.

As shown in FIG. 4, the second phase error calculating circuit 65 calculates a difference between the center value of the reproduction signal, and the sample value, as a phase error amount between a timing (phase) which obtained the sample value, and a timing (phase) which originally samples an edge of the reproduction signal. That is, as shown in FIG. 4, ideally in the reproduction signal of the PR(1,1) waveform, the center value of the reproduction signal is obtained as the sample value in the leading edge or the trailing edge. Therefore, the difference between the center value and an actually obtained sample value is defined as the phase error amount between the phase (timing) which obtained the sample value and the phase (timing) which may originally sample the leading edge or the trailing edge of the reproduction signal.

Especially, as shown in FIG. 4, the difference between the sample value (refer to "○" (white round) mark) which is obtained at the leading edge of the reproduction signal and the center value is defined as the phase error amount of the clock at the leading edge of the reproduction signal. Also, the difference between the sample value (refer to "▲" (black triangle) mark) obtained at the trailing edge of the reproduction signal and the center value is defined as the phase error amount of the clock in the trailing edge of the reproduction signal.

Like the first phase error calculating circuit 61, in a case of calculating the phase error amount of the clock in a fluctuation state of a plurality of sample values, when the waveform of the reproduction signal is symmetrical and stable, an accurate phase error amount can be obtained. However, if a reproduction signal waveform is distorted and an asymmetry becomes remarkable because the trailing waveform is distorted like the reproduction signal from a MSR medium (magneto-optical disc of a super resolution), an accuracy of the phase error calculated based on the fluctuation state of the sample value of the reproduction signal as mentioned above is degraded.

Similarly to the second phase error calculating circuit 65, the difference between the sample value and the center value is calculated as the phase error amount on a basis of the center value of the reproduction signal. As a result of this calculation, compared with a case where a phase error amount is calculated based on the fluctuation state of many sample values like the above-mentioned first phase error calculating circuit 61, it is hard to be influenced by a local distortion caused by the reproduction signal waveform.

Figure 5:
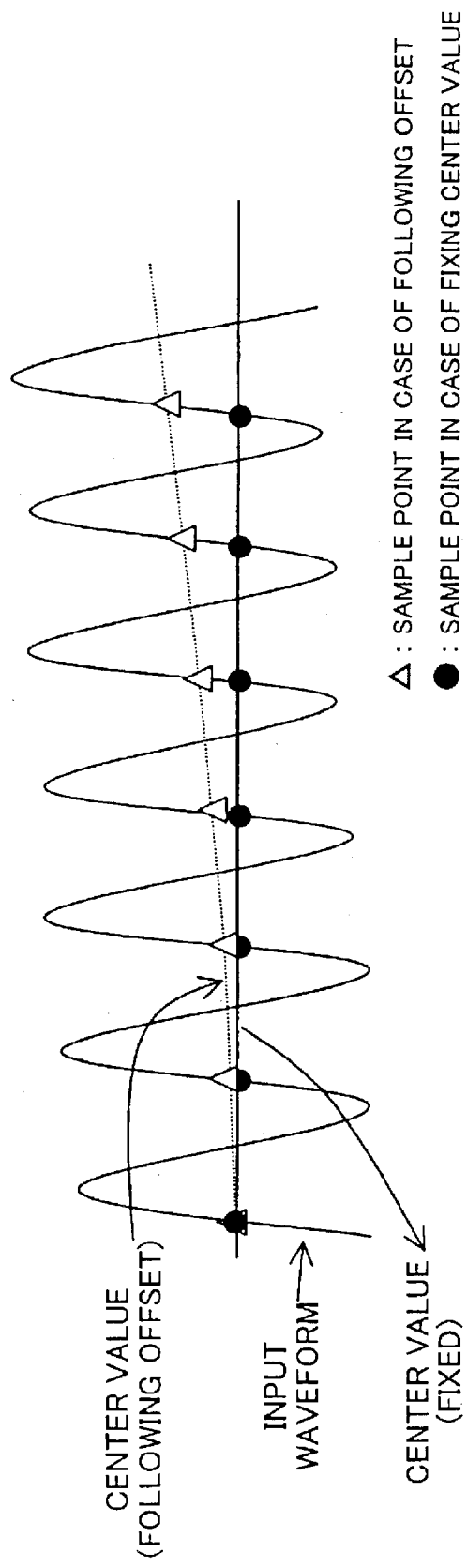
FIG. 5 is a diagram showing an example of an overall level fluctuation (envelope fluctuation) of the reproduction signal.

However, if the phase error amount is calculated on a basis of a fixed center value of the reproduction signal in a case of fluctuating the overall level of the reproduction signal (envelope fluctuation), the accuracy of the phase error amount will be degraded. For example, as shown in FIG. 5, in a case in which the overall level of the reproduction signal rises gradually, although the center value is going up, if the phase is adjusted based on the phase error amount calculated on a basis of the fixed center value, the phase of the clock is adjusted as shown by "●" (black round) mark so that the fixed center value is sampled. Then, the difference between the sample value ("Δ" (white triangle) mark) which should originally be obtained from the reproduction signal (input waveform) and the sample value ("●" (black round) mark) obtained synchronizing with the above clock becomes larger, and the phase of the clock to the reproduction signal cannot be precisely adjusted (leading-in of the phase).

Then, in the second phase error calculating circuit 65, the phase error amount is calculated based on a new center value that is obtained by adding an offset amount of the reproduction signal calculated by the offset detecting circuit 68 to the center value defined as a fixed value.

That is, the offset amount calculated by the offset detecting circuit 68 is adjusted by the gain adjusting circuit 69. The offset amount which gain is adjusted is added to a correction amount (can be zero) supplied from the control unit 200 by the adder 64. The offset amount, which is corrected and is output from the adder 64, is added to the fixed center value by the adder 63 from the center value calculating circuit 62. And an output value from the adder 63 is supplied to the second phase error calculating circuit 65 as the new center value.

The edge detecting circuit 66 detects the leading edge and the trailing edge of the reproduction signal based on the sample value from the ADC 41. A detected signal of the leading edge from the edge detecting circuit 66 is supplied to the output control circuit 67 as an enable signal. This output control circuit 67 selects and outputs either one of the phase error amount from the first phase error calculating circuit 61 and the phase error amount from the second phase error calculating circuit 65, based on a state of a phase error switching signal from the control unit 200, whenever the enable signal becomes effective (whenever the leading edge of the reproduction signal is detected). Therefore, the output control circuit 67 outputs a phase error amount (L-system phase error amount), whenever the leading edge of the reproduction signal is detected.

Thus, whenever the leading edge of the reproduction signal is detected, based on the phase error amount output from the output control circuit 67, the phase of the clock is adjusted (by the DAC 45 and the phase adjustment oscillation unit 46 shown in FIG. 1), so that the clock synchronized with the leading edge of the reproduction signal is supplied to the ADC 41.

Each concrete configuration of the edge detecting circuit 66, the offset detecting circuit 68, the gain adjusting circuit 69, and the output control circuit 67 will be described.

Figure 7:
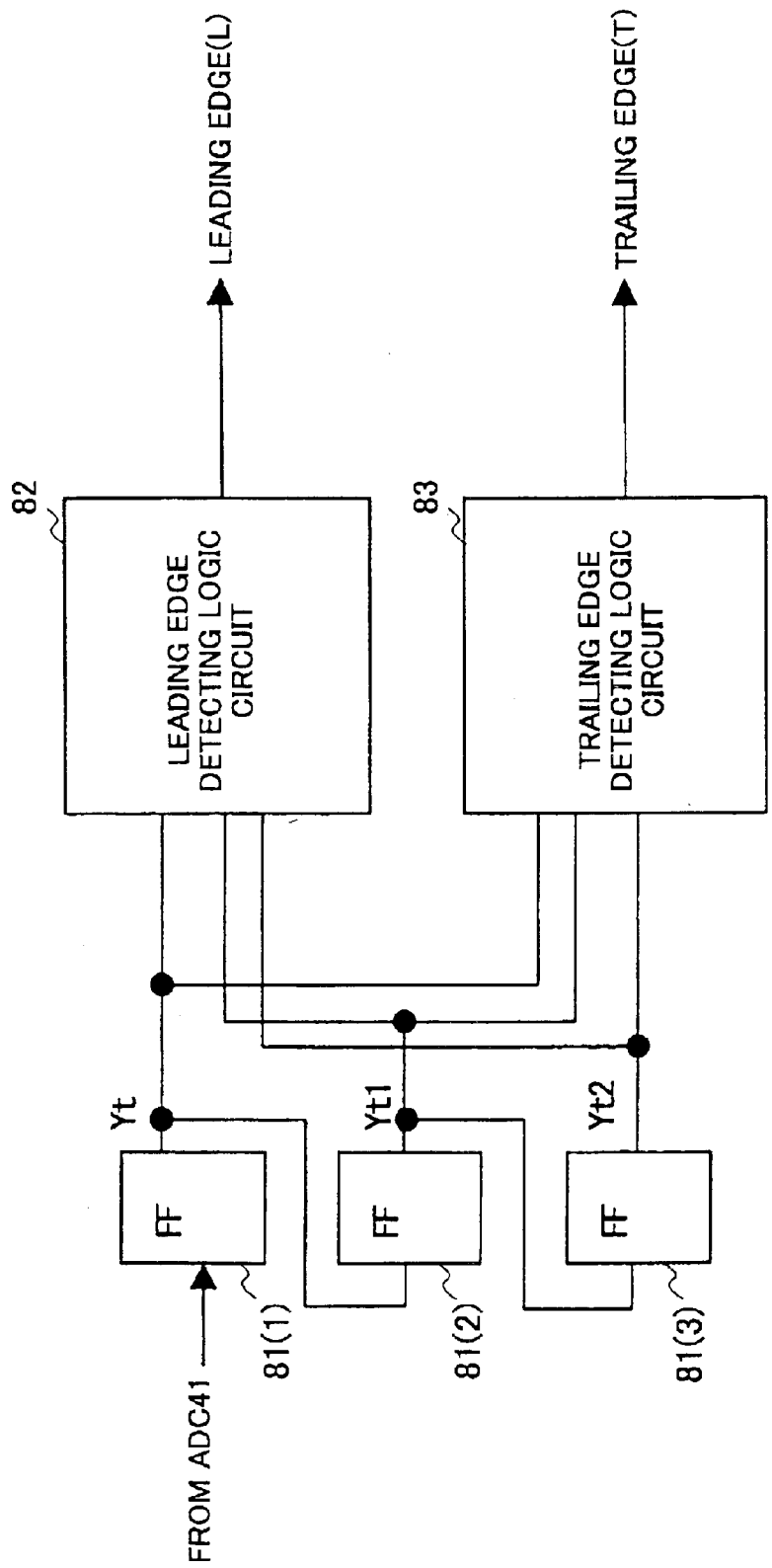
FIG. 7 is a diagram showing a configuration example of an edge detecting circuit.

First, the edge detecting circuit 66 is constituted as shown in FIG. 7.

In FIG. 7, the edge detecting circuit 66 includes flip flops 81(1), 81(2), and 81(3) which are serially connected, a leading edge detecting logic circuit 82 and a trailing edge detecting logic circuit 83. All flip flops 81(1), 81(2), and 81(3) are connected in series, and the sample value from the ADC 41 is sequentially shifted. And sample values $Y_t$, $Y_{t1}$, and $Y_{t2}$, which are set to the flip flops 81(1), 81(2), and 81(3), respectively, are supplied to the leading edge detecting logic circuit 82 and the trailing edge detecting logic circuit 83.

The leading edge detecting logic circuit 82 detects the leading edge of the reproduction signal based on three successive sample values $Y_t$, $Y_{t1}$, and $Y_{t2}$ set to the flip flops 81(1), 81(2), and 81(3), according to the following conditions:

(1) $Y_t > Y_{t1}$
(2) $Y_{t1} > Y_{t2}$
(3) $Y_t >$ center value
(4) $Y_{t2} <$ center value When above-mentioned conditions (1)-(4) are satisfied, the leading edge detecting logic circuit 82 outputs a detected signal of the leading edge (L).

That is, when three sample values $Y_{t2}$, $Y_{t1}$, and $Y_t$ simply increase from a smaller value than a center value sequentially to a larger value than a center value, the leading edge of the reproduction signal is detected.

It should be noted that the center value may be a value in which the offset amount is considered similarly to a value supplied to the second phase error calculating circuit 65, or the fixed center value calculated by the center value calculating circuit 62.

Moreover, the trailing edge detection logic detection logic circuit 83 detects the edge of the reproduction signal using three successive sample values $Y_t$, $Y_{t1}$, and $Y_{t2}$, based on the following conditions:

(5) $Y_t < Y_{t1}$
(6) $Y_{t1} < Y_{t2}$
(7) $Y_t <$ center value
(8) $Y_{t2} >$ center value When above-mentioned conditions (5)-(8) are satisfied, the trailing edge detecting logic circuit 83 outputs a detected signal of the trailing edge (T).

That is, when three sample values $Y_{t2}$, $Y_{t1}$, and $Y_t$ simply decrease sequentially from a larger value than the center value to a smaller value than the center value, the trailing edge of the reproduction signal is detected.

Figure 8:
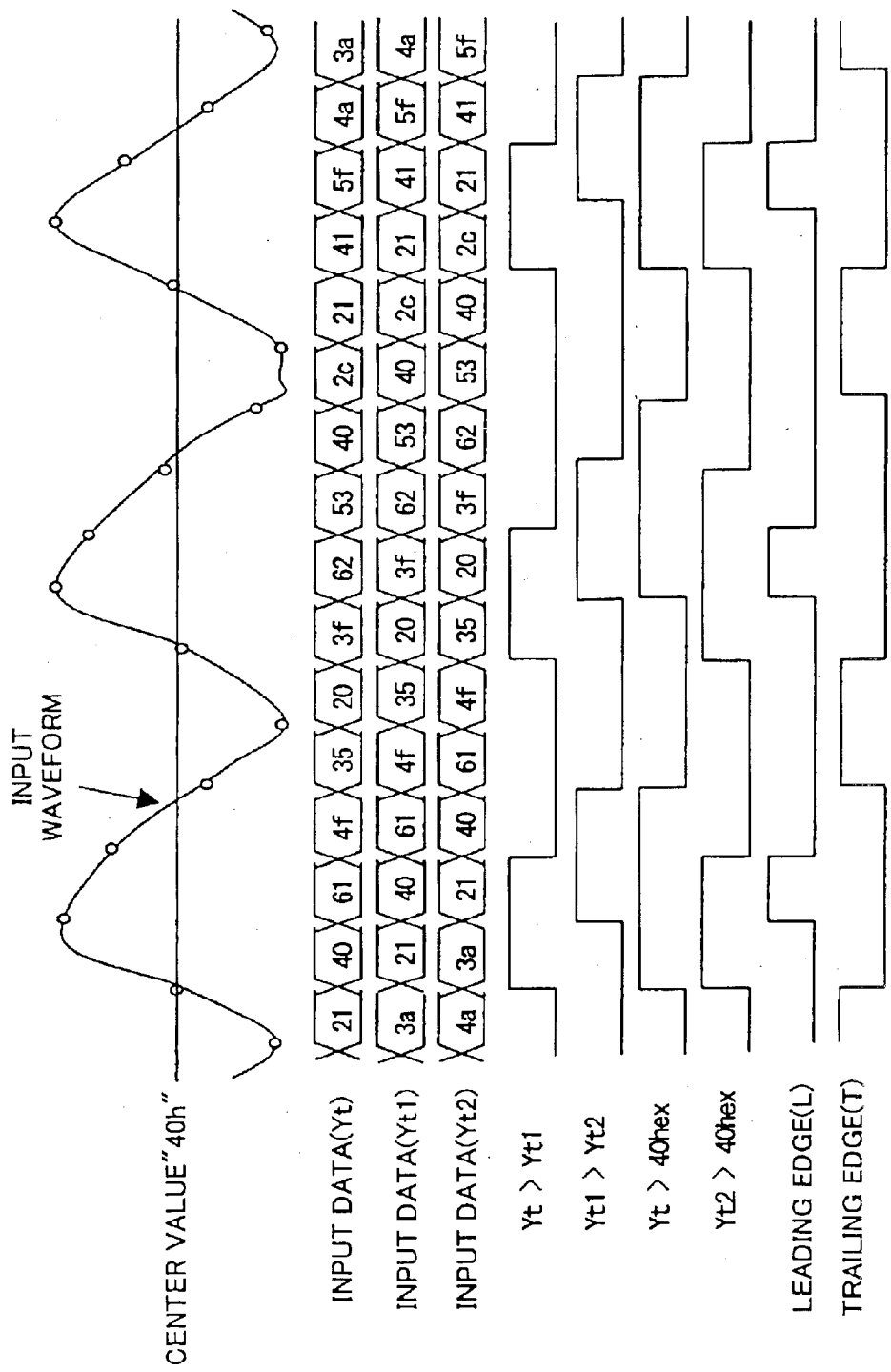
FIG. 8 is a diagram showing a timing chart showing an operation example of the edge detecting circuit.

The edge detecting circuit 66 operates like a timing chart shown in FIG. 8. In FIG. 8, in the case of a 7-bit output (the value of 0–7f (hexadecimal notation) can be taken in the ADC 41), 40 hex (hexadecimal notation) is set to the center value.

Hereinafter, the sample value is shown in the same notation form.

In a case in which the sample value $Y_t$ is obtained at a timing t as shown in FIG. 8, if the above-mentioned conditions (1), (2), (3), and (4) are satisfied based on the sample value $Y_t$ at the timing t and the sample values $Y_{t1}$ and $Y_{t2}$ that are already obtained at previous timings t−1 and t−2, a detected signal of the leading edge (L) is output at the timing t. Moreover, if the above-mentioned conditions (5), (6), (7), and (8) are satisfied in the timing t, a detected signal of the trailing edge (T) is output at the timing t. Each of above-mentioned detected signals maintains a state with the effective period in which corresponding conditions described above are satisfied.

The detected signal of the leading edge output from an edge detecting circuit 66 is supplied to the output control circuit 67 as the enable signal, as mentioned above. And the detected signal of the trailing edge that is at an opposite side of the leading edge (hereinafter, called an opposite edge) is supplied to the offset detecting circuit 68.

Next, the offset detecting circuit 68 calculates the offset amount based on the sample value supplied from the ADC 41 whenever the detected signal of the trailing edge (T) is supplied. That is, the offset detecting circuit 68 calculates the offset amount based on the sample value obtained from the trailing edge of the reproduction signal. It is based on the principle as shown in FIG. 6.

Figure 6:
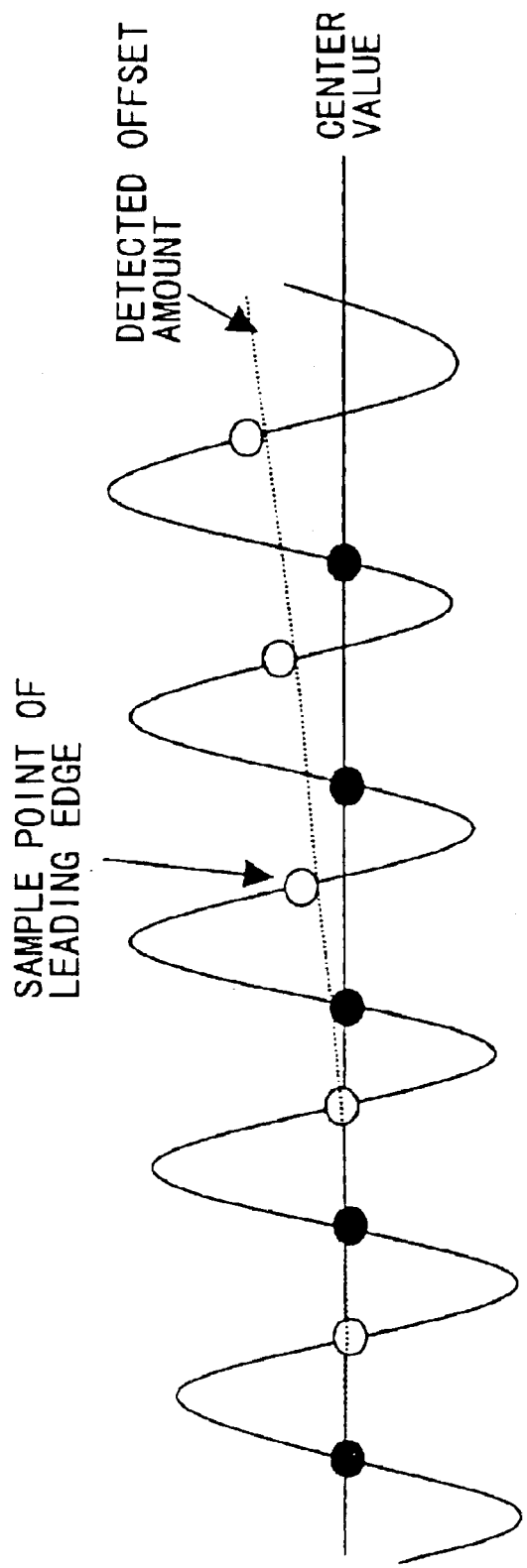
FIG. 6 is a diagram showing a principle for calculating an offset amount.

In FIG. 6, for example, the reproduction signal is sampled synchronizing with the clock, which phase is adjusted so that the sample value (refer to "●" (black round) mark) at the leading edge of the reproduction signal becomes the center value. In this sate, if the overall level of the reproduction signal rises, it indicates that the phase of the clock for obtaining each sample value has progressed relatively to the waveform of the reproduction signal. Therefore, with the rise of the overall level of a reproduction signal, the sample value ("○" (white round) mark) in the trailing edge of the reproduction signal sampled by the clock which phase is adjusted gradually becomes larger. Since the rise of the sample value in the trailing edge corresponds to the rise of the reproduction signal, a change in the sample values in the trailing edge of the reproduction signal can be used as an offset amount.

Figure 9:
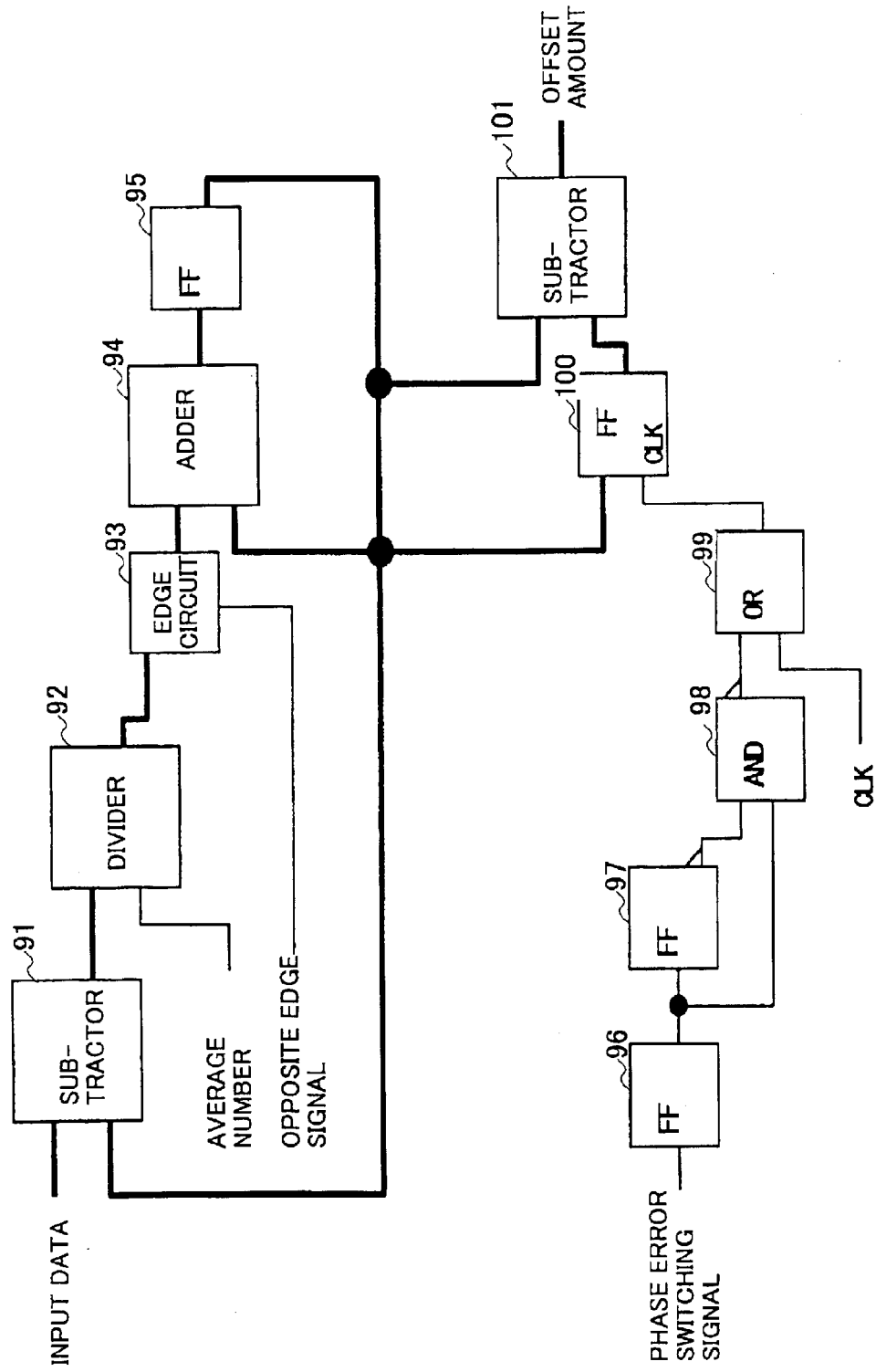
FIG. 9 is a diagram showing a configuration example of an offset detecting circuit.

The offset detecting circuit 68, which calculates the offset amount of the reproduction signal according to the above principle, is configured as shown in FIG. 9.

In FIG. 9, the offset detecting circuit 68 includes a subtractor 91, a divider 92, an edge selecting circuit 93, an adder 94, flip flops (FF) 95, 96, and 97, and an AND circuit 98, an OR circuit 99, a flip flop (FF) 100, and a subtractor 101.

The subtractor 91 calculates a difference value by subtracting a value (a moving average value mentioned later), which is set to the flip flop 95, from the sample value from the ADC 41. The divider 92 divides the difference value output from the subtractor 91 by an average number set beforehand and then the difference value (hereinafter, called a divided difference value) is calculated. The edge selecting circuit 93 includes the gate function for supplying the divided difference value from the divider 92 to the adder 94 when the detecting signal of the trailing edge (opposite edge) is supplied from the edge detecting circuit 66. That is, the above-mentioned divided difference value, which is calculated based on the sample value obtained at the trailing edge of the reproduction signal, is supplied to the adder 94.

The adder 94 adds the divided difference value supplied through the edge selecting circuit 93, and the value (moving average value) set to the flip flop 95, and then the adder 94 outputs the addition value. The flip flop 95 sets the added value from the adder 94 as a new moving average value. The moving average value of the sample value, which is obtained at the trailing edge of the reproduction signal by the subtractor 91, the divider 92, the edge selecting circuit 93, the adder 94, and the flip flop 95, is obtained in order.

In addition, the control unit 200 can arbitrarily set the average number for calculating the above-mentioned moving average value. If the average number becomes greater, the divided difference value becomes smaller and then one sample value influences less on the moving average value. That is, a responsibility to a change of the reproduction signal degrades. Moreover, if the average number is smaller, the divided difference value becomes larger and then one sample value influences on the moving average value greater. The responsibility to the change of the reproduction signal improves.

The flip flop 96 into which the phase error switching signal from the control unit 200 is input is connected to the flip flop 97. An output of the flip flop 96 and a reversed output of the flip flop 97 are supplied to the AND circuit 98, and the reversed output of the AND circuit 98 is input into the OR circuit 99 by a clock signal. In such configuration, when the above-mentioned phase error switching signal rises, one pulse is output from the OR circuit 99. The above-mentioned moving average value, which is set to the flip flop 95 while the pulse from OR circuit 99 rises, is latched to the flip flop 100.

When switching the phase error amount, which should be used for a phase adjustment, from the phase error amount obtained by the first phase error calculating circuit 61 to the phase error amount obtained by the second phase error calculating circuit 65, if the above-mentioned phase error switching signal has started to rise, an average (hereinafter, called a reference trailing edge level) of the sample values at the trailing edge of the reproduction signal, which is set to the above-mentioned flip flop 95 at the switching time, is latched to the flip flop 100. The subtractor 101 subtracts the above-mentioned reference trailing edge level latched to the flip flop 100 from the moving average value of the sample value at the trailing edge of the reproduction signal that is set to the flip flop 95. Then, the subtractor 101 outputs those difference values as offset amounts.

In such a configuration, the offset detecting circuit 68 outputs the difference value between the reference trailing edge level latched when the phase error amount to be used for adjusting the phase is switched to the phase error amount obtained by the second phase error calculating circuit 65, and the sample value (moving average value) at the trailing edge obtained after switching, as an offset amount. That is, when the phase error amount in the second phase error calculating circuit 65 is selected, the second phase error calculating circuit 65 calculates the phase error amount by using the center value in which a change of the sample values at the trailing edge of the reproduction signal is considered as the offset amount.

Figure 10:
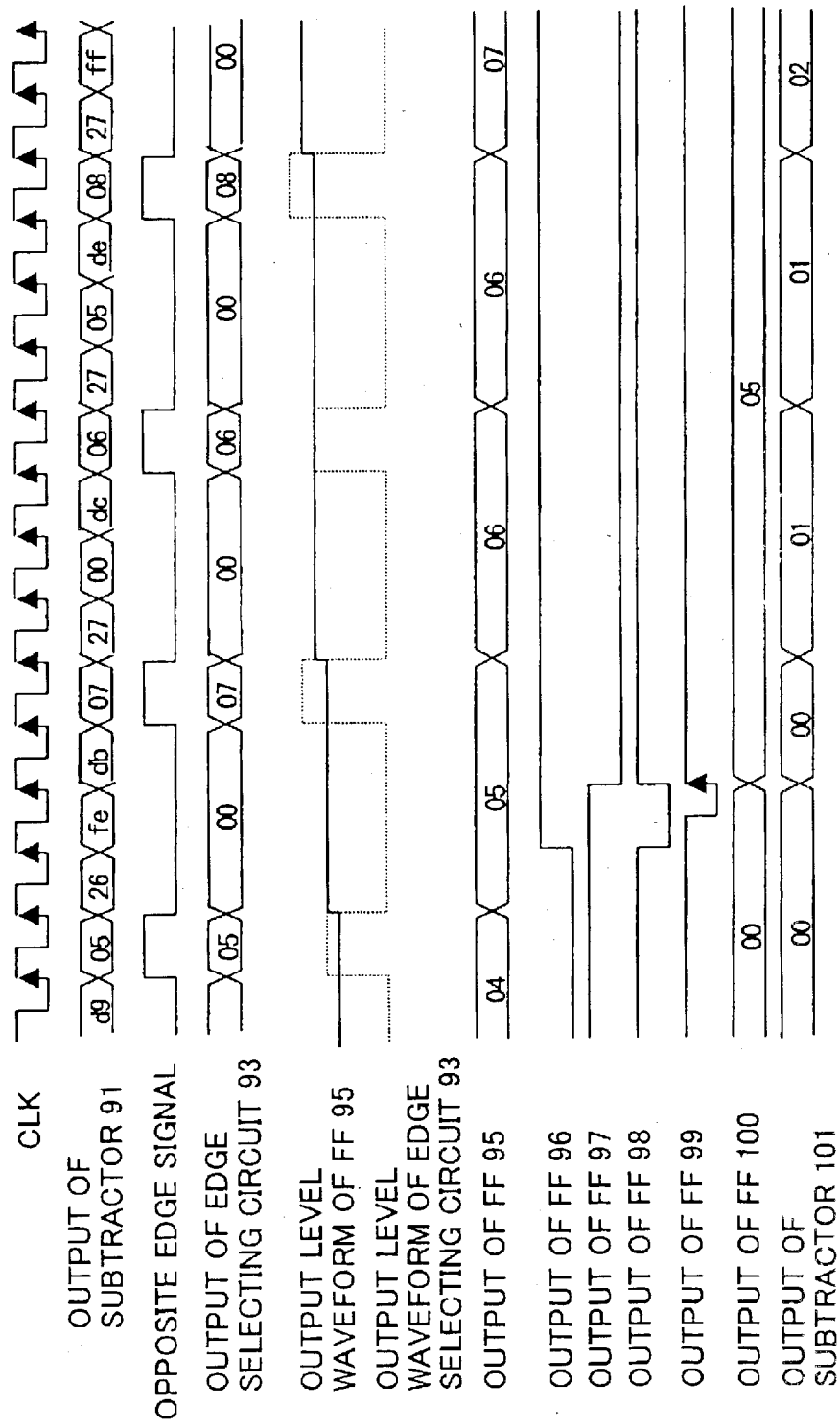
FIG. 10 is a diagram showing a timing chart showing an operation example of an offset detecting circuit.

The above-mentioned offset detecting circuit 68 operates like a timing chart shown in FIG. 10.

In FIG. 10, when the phase error switching signal (output of the flip flop 96) starts, the average (output of the flip flop 95) "05" of the sample value at the trailing edge (opposite edge) is set to the flip flop 100 as a reference trailing edge level. After that, whenever each of the averages (outputs of the flip flop 96) "05", "06", "06", "07", . . . of the sample values at the trailing edge is obtained, each of difference values "00", "01", "01", "02", . . . between each of the averages and the reference trailing edge level "05" latched to the above-mentioned flip flop 100" is obtained as the offset amount.

Figure 11:
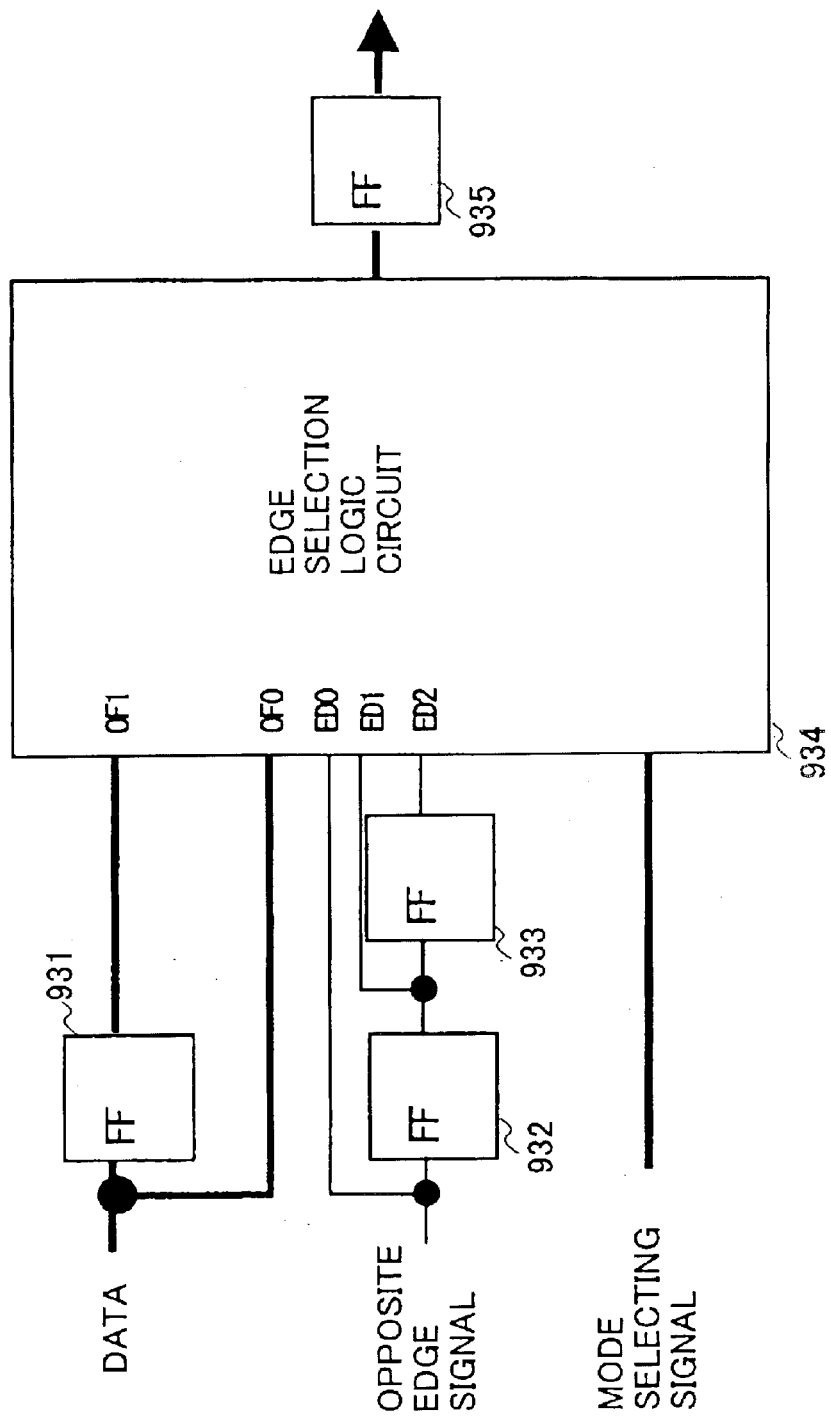
FIG. 11 is a diagram showing a configuration example of an edge selecting circuit.

The edge selecting circuit 93 provided in the offset detecting circuit 68 is configured as shown in FIG. 11.

In a case in which the trailing waveform of the reproduction signal is distorted like a MSR medium (refer to an input waveform Q shown in FIG. 12), unfavorably, the edge detection logic in the trailing detecting logic circuit 83 in the edge detecting circuit 66 shown in FIG. 7 may continuously detect edges at two clocks in the trailing waveform part of the reproduction signal. Even in such case, the edge selecting circuit 93 in a configuration shown in FIG. 11 sets the sample value only at the trailing edge of a single trailing waveform as an object of the moving average.

In FIG. 11, the edge selecting circuit 93 includes flip flops 931, 932, 933, and 935 and an edge selection logic circuit 934. The divided difference value from the divider 92 in the offset detecting circuit 68 is directly input into the edge selection logic circuit 934 as a signal 0F1 and is also input into the edge selection logic circuit 934 as a signal 0F0 through the flip flop 931. The detecting signal of the trailing edge (opposite edge) from the edge detecting circuit 66 is directly input into the edge selection logic circuit 934 as a signal ED0 and is also input into the edge selection logic circuit 934 as a signal ED1 through a flip flop 932. Moreover, the detecting signal is input into the edge selection logic circuit 934 as a signal ED2 through flip flops 932 and 933.

Furthermore, a mode selecting signal from the control unit 200 is input into the edge selection logic circuit 934. The mode selecting signal is a control signal for specifying any one of the following three modes.

In a mode 1, the edge selection logic circuit 934 outputs the divided difference value according to the following conditions:
  (1) In a case of ED0=0 (when the detecting signal of the trailing edge is for one clock) at a timing of ED2=0 and ED1=1,
    Output: a signal 0F1
  (2) In a case of ED0=1 (when the detecting signal of a trailing edge is a part for two clocks) at a timing of ED2=0 and ED1=1,
    (i) Output: a signal 0F0 if 0F0<=0F1
    (ii) Output: a signal 0F0 if 0F0<=0F1
  (3) At a timing other than ED2=0 and ED1=1
    Output: "0"

In the mode 1, in a case in which the detecting signal of the trailing edge for two successive clocks (opposite edge) is supplied (case (2)), a smaller divided difference value is output so that a closer sample value to the moving average value of the sample values is set as an object of a next moving average.

In the mode 2, the edge selection logic circuit 934 outputs the divided difference value according to the following conditions:
  (1) At a timing of ED2=0 and ED1=1 (when the detecting signal of the trailing edge is for both one clock and two clocks),
    Output: a signal 0F1
  (2) At a timing other than ED2=0 and ED1=1,
    Output: "0"

In the mode 2, in a case in which the detecting signal of the trailing edge for two successive clocks is supplied (case (1)), the signal 0F1 (divided difference value) is output so as to set the sample value obtained in the front edge detection as an object of the moving average value.

In the mode 3, the above-mentioned edge selection logic circuit 934 outputs the divided difference value according to the following conditions:
  (1) In a case of ED0=0 (when the detecting signal of a trailing edge is a part for one clock) at a timing of ED2=0 and ED1=1,
    Output: a signal 0F1
  (2) In a case of ED0=1 (when the detecting signal of a trailing edge is a part for two clocks) at timing of ED2=0 and ED1=1,
    Output: a signal 0F0
  (3) At timing other than ED2=0 and ED1=1,
    Output : "0"

In the modes 3, in a case in which the detecting signal of the trailing edge for two successive clocks is supplied (case (2)), the signal 0F0 (divided difference value) is output so as to set the sample value obtained in a next edge detection as an object of the moving average value.

The divided difference value output from the edge selection logic circuit 934 in accordance with the above conditions is set to the flip flop 935, and is supplied to the adder 94 provided as a next stage (refer to FIG. 9).

Figure 12:
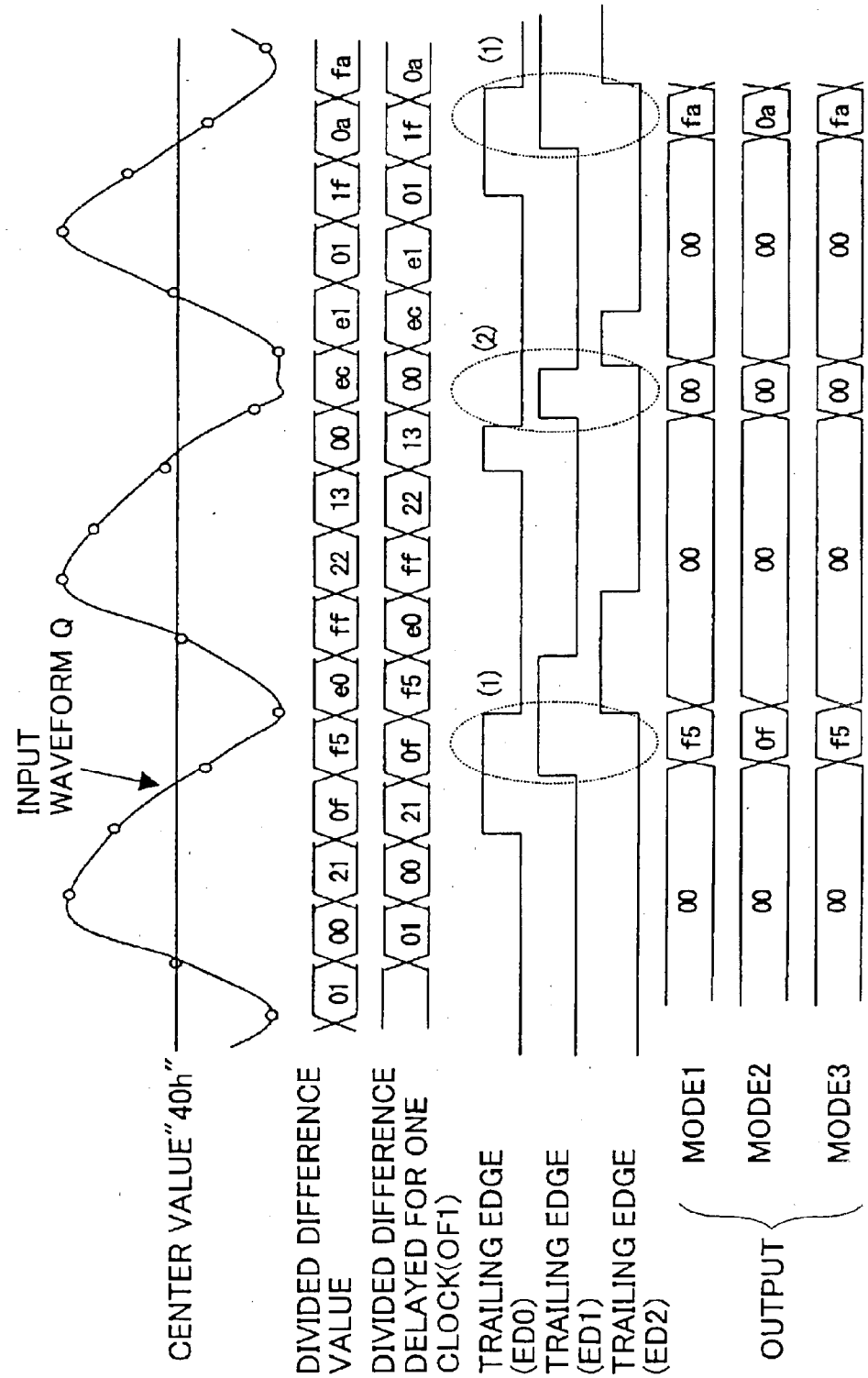
FIG. 12 is a diagram showing a timing chart showing an operation example of an edge selecting circuit.

The edge selecting circuit 93 configured above operates like a timing chart shown in FIG. 12.

If the trailing edges (two edges) are continuously detected for two clocks by the trailing waveform of the reproduction signal by the edge detecting circuit 66, the signals ED2, ED1, and ED0, which are input to the edge selection logic circuit 934 based on the detecting signal, change like a part (1) of FIG. 12. Moreover, if only one edge is detected by the trailing waveform of the reproduction signal in the edge detecting circuit 66, the signals ED2, ED1, and ED0, which are input to the edge selection logic circuit 934 based on the detecting signal, change like a part (2) of FIG. 12.

In a case in which the trailing edges are successively detected for two clocks, when the mode 1 is indicated by the mode selecting signal, as shown in the part (1) of FIG. 12, at a detection timing of the two trailing edges, a smaller divided difference value "f5" (0F0)) is output from the edge selecting circuit 93 among a divided difference value "0f" (0F1)) and a divided difference value "f5" (0F0)) supplied from the divider 92. Thus, by outputting the smaller divided difference value, fluctuation of the moving average value of the sample value at the trailing edge of the reproduction signal obtained by the adder 94 does not become large, but an influence to the offset amount by the waveform distortion of the reproduction signal becomes smaller. Therefore, the offset amount stabilized more can be obtained.

Figure 13:
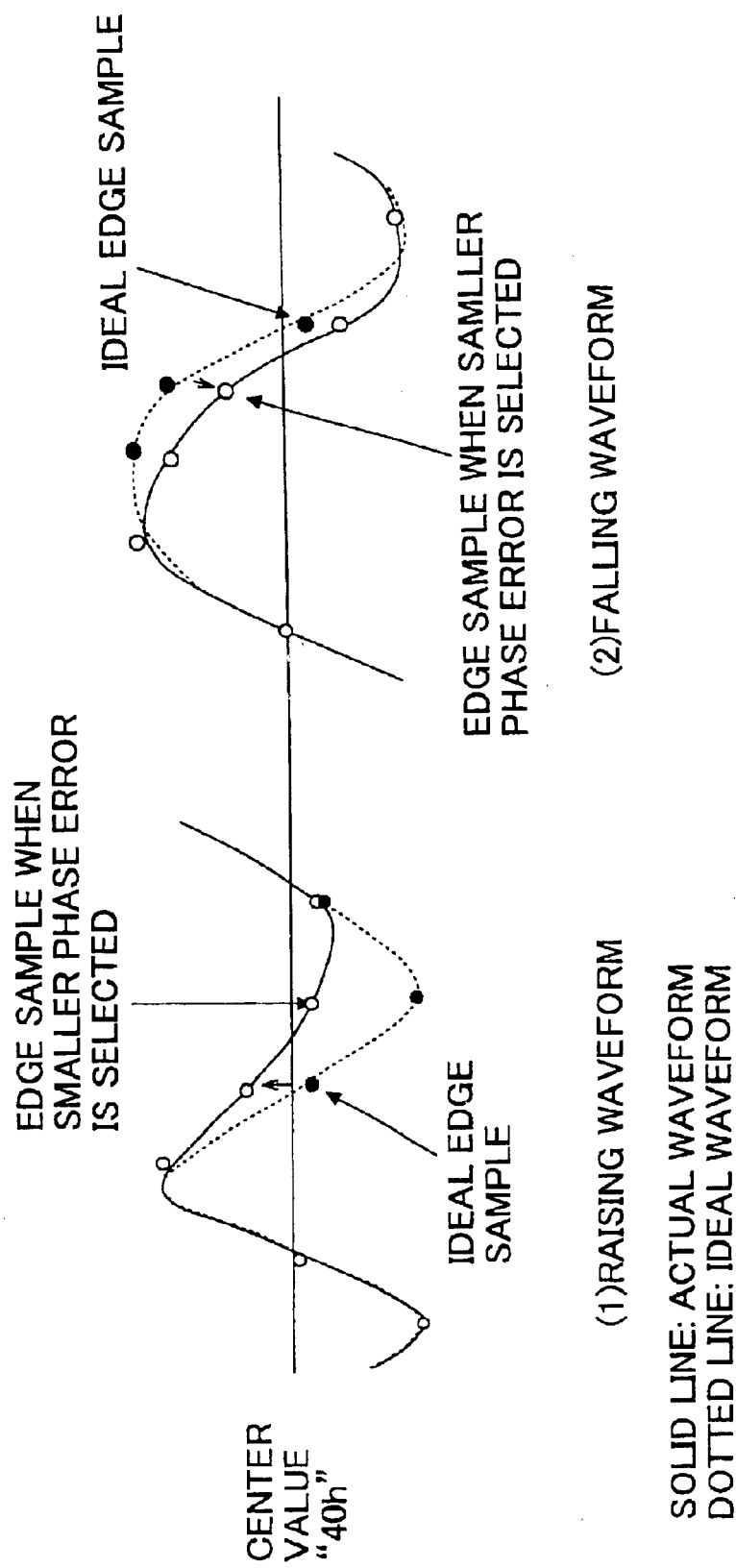
FIG. 13 is a diagram showing a relationship between a waveform distortion and a sample value in the reproduction signal.

The divided difference value "0f" (0F1)), which corresponds to the sample value obtained when a previous edge is detected, is output from the edge selecting circuit 93 among two divided difference values "0f" (0F1)) and "f5" (0F0)). As by outputting the divided difference value corresponding to the sample value obtained when the previous edge is detected, as shown in FIG. 13 (1), when the trailing waveform of the reproduction signal is raised, the moving average is conducted by using the divided difference value corresponding to the sample value in more proper trailing edge. As a result, it is possible to obtain a stable offset amount.

In the case in which the trailing edges are successively detected for two clocks, when the mode 3 is indicated by the mode selecting signal, the divided difference value "f5" (0F0)), which corresponds to the sample value obtained when a following edge is detected, is output from the edge selecting circuit 93 among two divided difference values "0f" (0F1)) and "f5" (0F0)). As by outputting the divided difference value corresponding to the sample value obtained when the following edge is detected, as shown in FIG. 13 (2), when the trailing waveform of the reproduction signal is felled, the moving average is conducted by using the divided difference value corresponding to the sample value in more proper trailing edge. As a result, it is possible to obtain a stable offset amount.

On the other hand, in a case in which a single edge is detected in the trailing waveform of the reproduction signal, even if any one of the mode 1, the mode 2, and the mode 3 is selected by the mode selecting signal, as shown in the part (2) of FIG. 12, the divided difference value "00" (0F1)) corresponding to the sample value obtained at timing of the detecting signal ED1 for the trailing edge is output from the edge selecting circuit 93 at the timing.

As mentioned above, each mode can be decided based on a characteristic of the reproduction signal waveform obtained from a recording medium.

Figure 14:
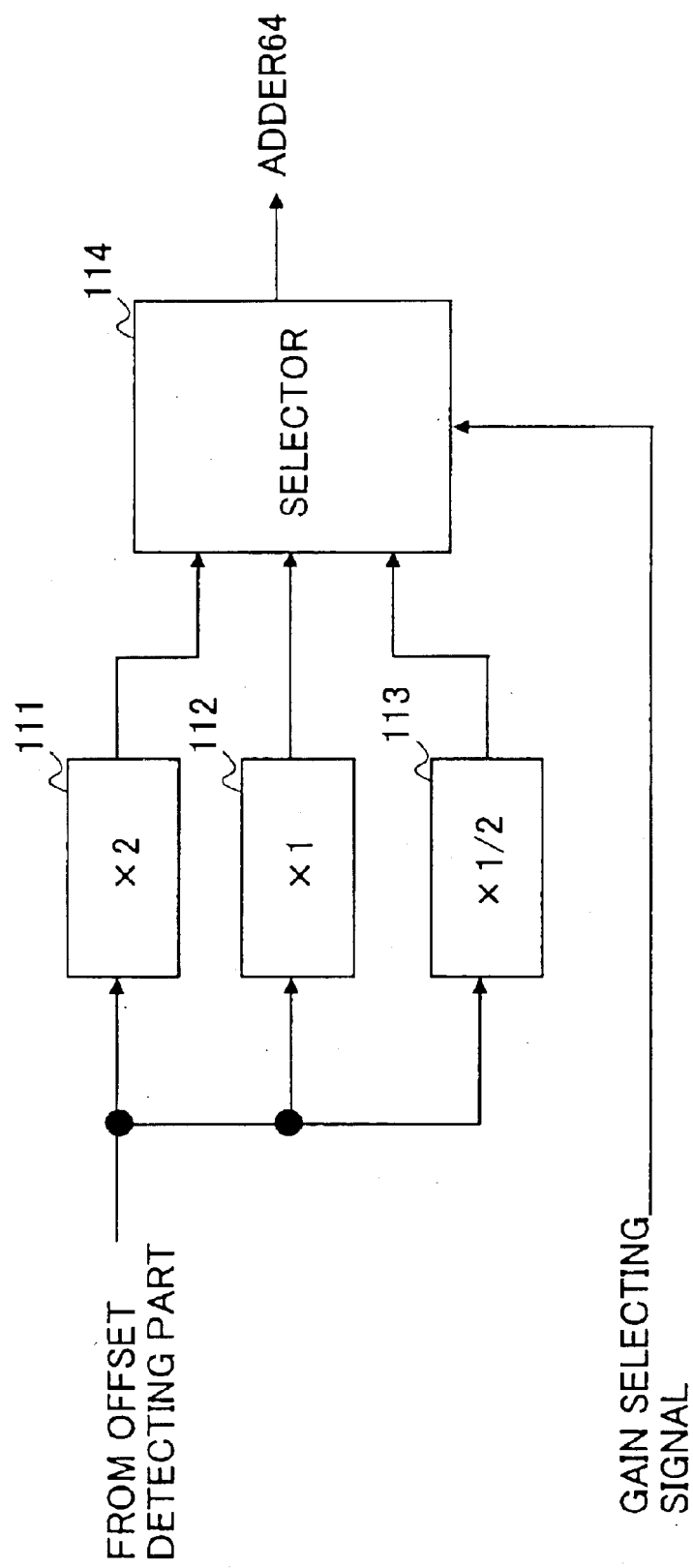
FIG. 14 is a diagram showing a configuration example of a gain adjusting circuit.

Furthermore, for example, the gain adjusting circuit 69 is constituted as shown in FIG. 14.

In FIG. 14, the gain adjusting circuit 69 includes constant multipliers 111, 112, and 113 and a selector 114. The constant multiplier 111 multiplies an offset amount by a constant "2" from the offset detector 68, and outputs a twice as many offset amount as the detected offset amount. The constant multiplier 112 multiplies the offset amount by the constant "1", and outputs the same offset amount (one times the offset amount) as the detected offset amount. The constant multiplier 113 multiplies the offset amount by a constant "½", and outputs ½ times the offset amount of the detected offset amount. According to the gain selecting signal from the control unit 200, the selector 114 selects two times the offset amount, one times the offset amount, or ½ times the offset amount, and then the selector 114 supplies a selected offset amount to the adder 64 as a final offset amount (refer to FIG. 3).

In response to the offset amount detected by the offset detecting circuit 68, a delay of feedback, and the like, by this gain adjusting circuit 69, it becomes possible for the second phase error calculating circuit 65 to use the offset amount adjusted with the optimal gain (two times, one times, ½ times).

Figure 15:
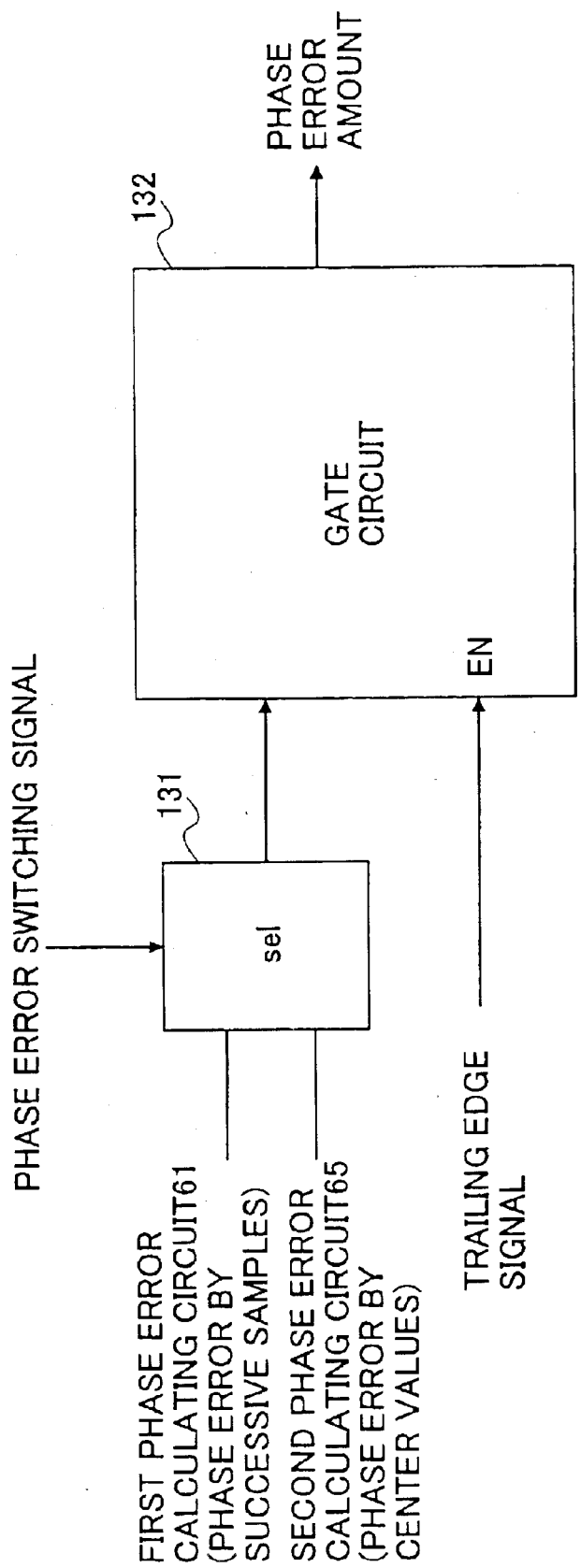
FIG. 15 is a diagram showing a configuration example of an output control circuit.

Moreover, the output control circuit 67 is constituted as shown in FIG. 15.

In FIG. 15, this output control circuit 67 includes a selecting circuit (sel) 131 and a gate circuit 132. The selecting circuit 131 selects either one of the phase error amount obtained from the successive sample values at the first phase error calculating circuit 61, and the phase error amount obtained on the basis of the center value of the reproduction signal at the second phase error calculating circuit 65, based on the state of a phase error switching signal. The gate circuit 132 inputs the detecting signal of the leading edge from an edge detecting circuit 66 as an enable signal (EN), and then the gate circuit 132 outputs the phase error amount selected by the selecting circuit 131 whenever the detecting signal of the leading edge is supplied.

The configuration mentioned above is a configuration of the phase error amount detecting part 44 in the leading edge processing part 40. On the other hand, in FIG. 2, the phase error amount detecting part 54 in the trailing edge processing part 50 includes a first phase error calculating circuit 71, a center value calculating circuit 72, adders 73 and 74, a second phase error calculating circuit 75, an edge detecting circuit 76, and an output control circuit 77.

Based on a plurality of successive sample values (for example, three successive sample values) supplied from the ADC 51, the first phase error calculating circuit 71 calculates the phase error amount in accordance with the same logic as the first phase error calculating circuit 61 in the phase error amount detecting part 44 of the leading edge processing part 40 (refer to FIG. 3). Moreover, the center value calculating circuit 72 also calculates a fixed center value of the reproduction signal by the same process as the center value calculating circuit 62 in the phase error amount detecting part 44 of the leading edge processing part 40.

The adder 74 adds the offset amount from the offset detecting circuit 68 in the phase error amount detecting part 44 of the leading edge processing part 40, to a correction amount (may be zero) supplied from the control unit 200. Similarly to the configuration in the phase error amount detecting part 44 of the leading edge processing part 40, a corrected offset amount output from the adder 74 is added to the fixed center value from the center value calculating circuit 72 by the adder 73. And an output value from the adder 73 is supplied to the second phase error calculating circuit 75 as a new center value.

The second phase error calculating circuit 75 inputs the sample value from the ADC 51 and the center value from the adder 73, and then calculates the phase error amount using the same approach as the second phase error calculating circuit 65 in the phase error amount detecting part 44 of the leading edge processing part 40 (refer to FIG. 4). The edge detecting circuit 76 includes the configuration shown in FIG. 7, and the same configuration (the leading edge detecting logic circuit 82 can be excluded), and detects the trailing edge of the reproduction signal based on the fluctuation state of three successive sample values from the ADC 51 (in accordance with the above-mentioned conditions (5)–(8)). The detecting signal of the trailing edge of the reproduction signal from the edge detecting circuit 76 is supplied to the output control circuit 77 as the enable signal.

The output control circuit 77 includes the configuration shown in FIG. 15, and the same configuration. Based on the state of the phase error switching signal from the control unit 200, the output control circuit 77 selects and outputs either one of the phase error amount from the first phase error calculating circuit 71, and the phase error amount from the second phase error calculating circuit 75, whenever the enable signal becomes effective (whenever the trailing edge of the reproduction signal is detected).

Therefore, whenever the trailing edge of the reproduction signal is detected, based on the phase error amount output from the output control circuit 77, the phase of the clock is adjusted (by the DAC 55 and the phase adjustment oscillation unit 56 shown in FIG. 1), so that the clock synchronized with the leading edge of the reproduction signal is supplied to the ADC 51, as described above.

In the embodiment, the second phase error calculating circuit 75 in the phase error amount detecting part 54 of the trailing edge processing part 50 calculates the phase error amount using the offset amount obtained by the phase error amount detecting part 44 of the leading edge processing part 40. However, it is not limited to such this configuration. The phase error amount detecting part 54 of the trailing edge processing part 50 can be provided with another offset detecting circuit having a configuration similar to the above-mentioned offset detecting circuit 68 (refer to FIG. 9 and FIG. 11). In this case, since the phase error amount detecting part 54 of the trailing edge processing part 50 detects the phase error amount in the trailing edge of the reproduction signal, another offset detecting circuit calculates the offset amount based on the sample value (moving average value) at the leading edge being an edge at an opposite side of the trailing edge of the reproduction signal.

Thus, in a case in which another offset detecting circuit is provided in the phase error amount detecting part 54 of the trailing edge processing part 50, each of phase error amount detecting parts 44 and 54 can calculate the phase error amount using the offset amount independently detected. Alternatively, on the contrary to the above example (refer to FIG. 2), the offset amount obtained in another offset detecting circuit provided in the phase error amount detecting part 54 of the trailing edge processing part 50 can also be supplied to the phase error amount detecting part 44 of the leading edge processing part 40.

Figure 16A:
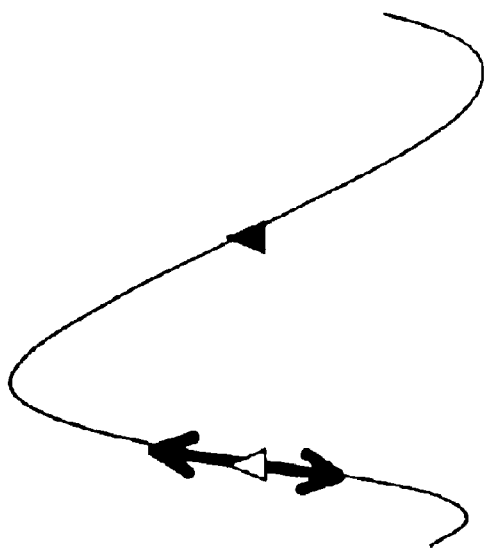
FIG. 16A is a diagram showing a relationship between a waveform distortion and a sample value in the reproduction signal in a case of locking to a leading edge and FIG. 16B is a diagram showing the relationship between the waveform distortion and the sample value in the reproduction signal in a case of locking to a trailing edge.
Figure 16B:
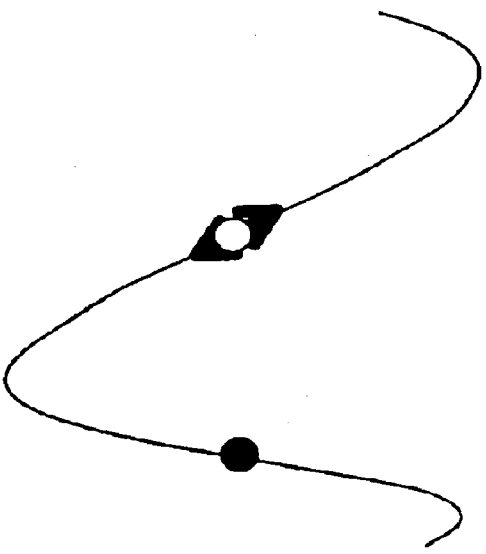

As shown in FIG. 16A and FIG. 16B, like the MSR medium, in a case in which the trailing waveform generously changes with distortion compared with the leading waveform in the reproduction signal, the fluctuation (refer to FIG. 16A) of the sample value for phase fluctuation of the clock in the trailing edge becomes smaller than the fluctuation (refer to FIG. 16B) of the sample value to phase fluctuation of the clock in the leading edge. Hence, in a case in which the record medium including the characteristic of the reproduction signal like the MSR medium is assumed, similarly to the example mentioned above, the stable offset amount can be obtained in a case (of FIG. 16A) in which the offset amount is calculated based on the sample value in the trailing edge while adjusting the phase of the clock so as to synchronize with the leading edge of the reproduction signal (the second phase error calculating circuit 65) more than in a case (of FIG. 16B) in which the offset is calculated based on the sample value in the leading edge while adjusting the phase of the clock so as to synchronize with the trailing edge of the reproduction signal (the second phase error calculating circuit 75).

Figure 17:
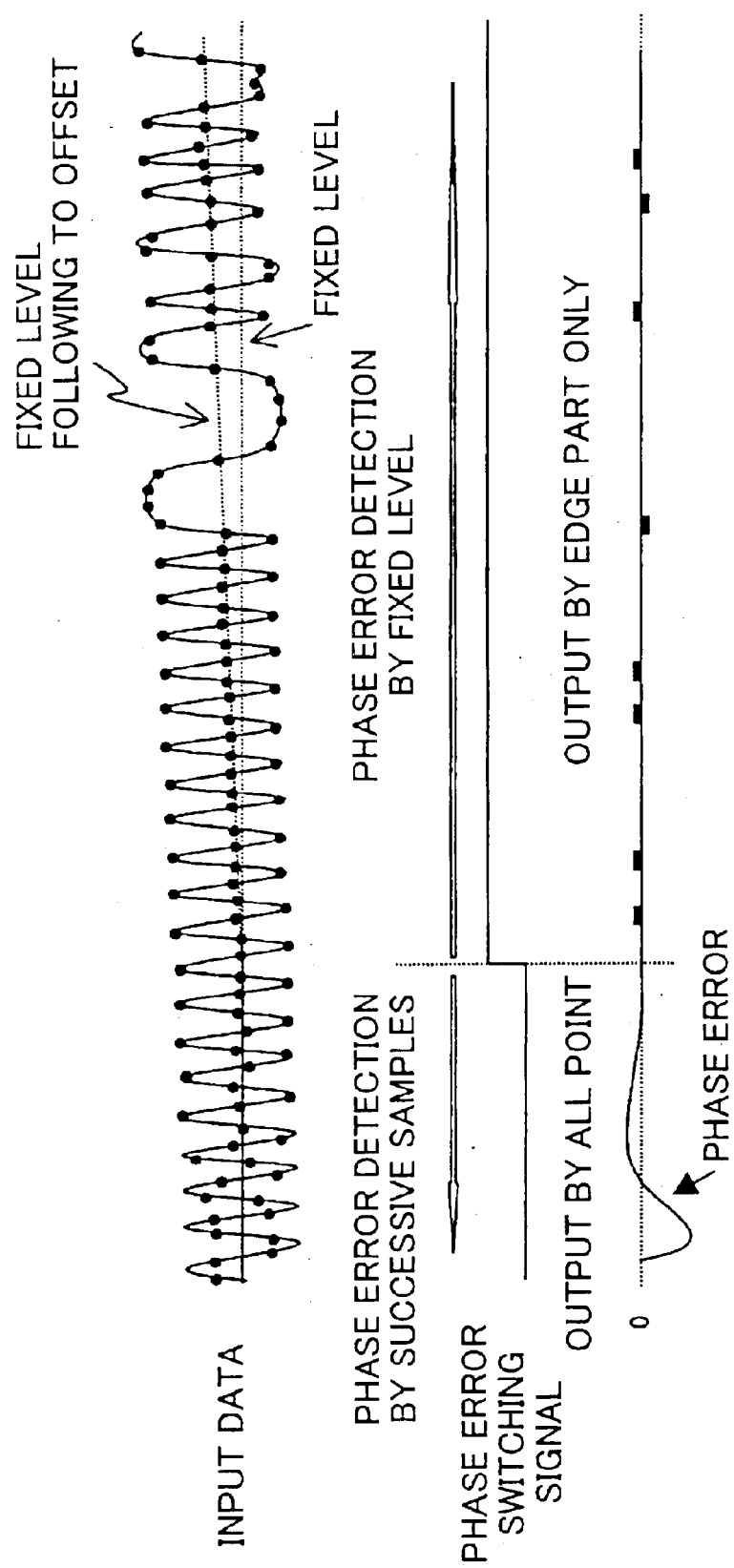
FIG. 17 is a diagram showing a timing chart showing an example of a phase error switching timing to be used.

The control unit 200 supplies the phase error switching signal which changes at a timing as shown in FIG. 17 to each of the phase error amount detecting parts 44 and 54.

Referring to FIG. 17, in the initial stage of the phase adjustment, the phase error is selected from first phase error calculating circuits 61 or 71, and the phase of the clock is adjusted based on the phase error amount obtained from the fluctuation state in a plurality of sample values. And in a (lead-in) state (or a phase locked state) in which the phase of the clock is approached to the phase of the edges (the leading edge and the trailing edge) of the reproduction signal to some extent, the phase error switching signal is started. Thereby, in the state (or the phase locked state) in which the phase of the clock is approached to the phase of the edges of the reproduction signal to some extent, the phase error is selected from the second phase error calculating circuit 65 and 75, and then the phase of the clock is adjusted based on the phase error amount on the basis of the center value (fixed level following the offset) in consideration of the offset amount.

The difference between the center value (fixed level) and the sampled data at the edge of the reproduction signal is large, and when a maximum phase shift has occurred, it is difficult to lead the phase of the clock into the phase of the edge of the reproduction signal based on the phase error amount (the maximum phase shift) on the basis of the center value. Since the difference between the center value and the sample value in the edge of the reproduction signal is comparatively large in the initial stage of the phase adjustment, as mentioned above, the phase of the clock is adjusted based on the phase error amount obtained from the fluctuation state of the plurality of the sample values, so that the phase of the clock can be comparatively closer to the phase of the edge of the reproduction signal in an earlier stage. Since the phase is adjusted based on the phase error amount on the basis of the center value of the reproduction signal in consideration of the offset amount where the phase of the clock is led some extent into the phase of the edge of the reproduction signal (or the phase locked state), the reproduction signal includes an asymmetrical waveform, and further, even if the overall level changes, it is possible to continuously conduct a stable phase adjustment for the clock from the initial stage of the phase adjustment.

Figure 18:
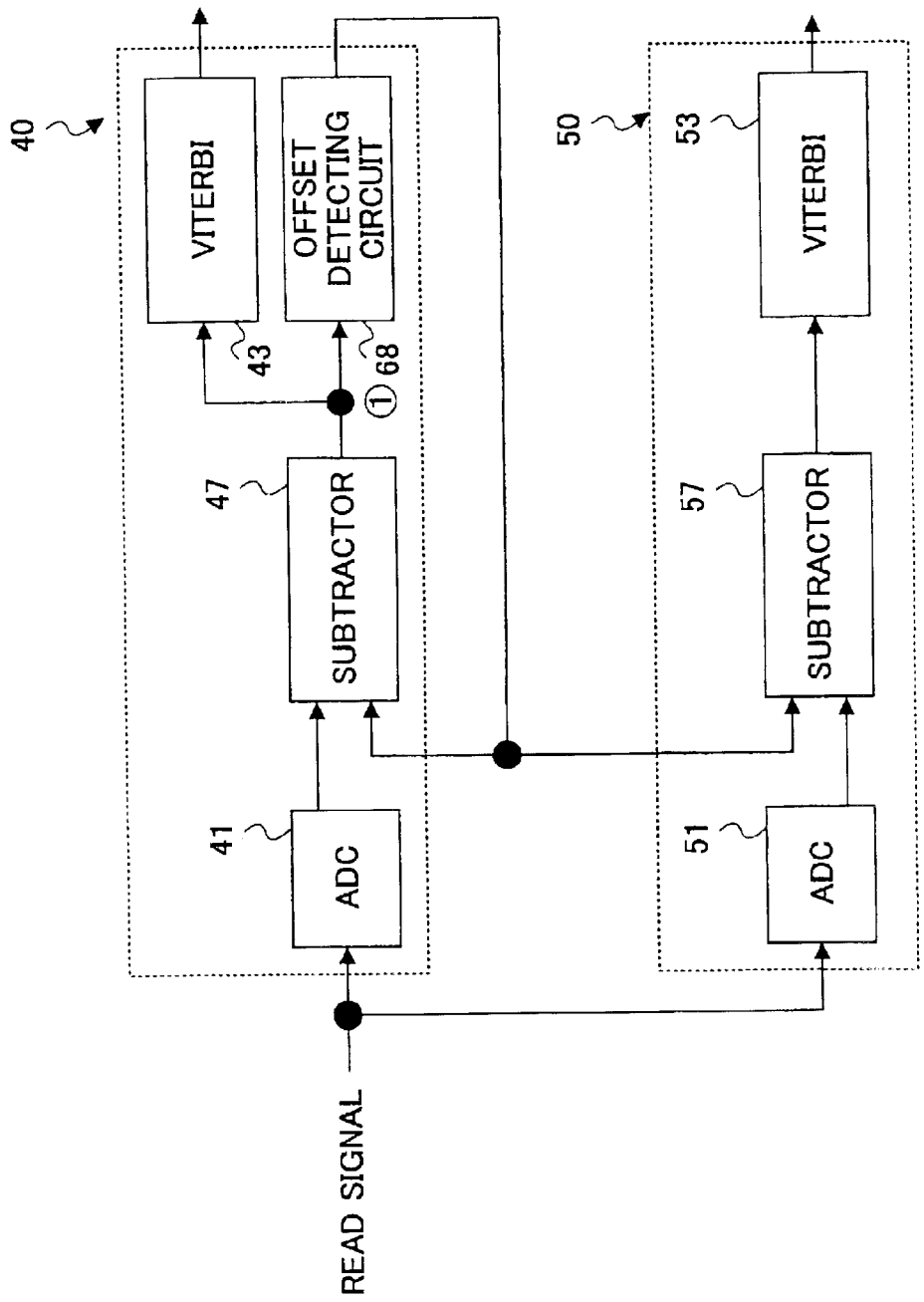
FIG. 18 is a diagram showing another example of the offset detecting circuit.

In the embodiment, the offset amount obtained by the offset detector 68 is used for the phase adjustment of the clock. This offset amount can also be used for other processes. For example, it is also possible to reflect the offset amount to the sample value of the reproduction signal. In this case, the leading edge processing part 40 and the trailing edge processing part 50 are configured as shown in FIG. 18. In addition, in FIG. 18, the circuit related to the phase adjustment of the clock is omitted.

In FIG. 18, the leading edge processing part 40 and the trailing edge processing part 50 include the ADCs 41 and 51 and the Viterbi decoders 43 and 52 similarly to the example (refer to FIG. 1) mentioned above, and also include the subtractors 47 and 57. Moreover, the leading edge processing part 40 includes the offset detecting circuit 68, which is similar to the configuration in the example mentioned above (refer to FIG. 9 and FIG. 11).

The offset amount detected by the offset detector 68 is supplied to the subtractor 47 and is also supplied to the subtractor 57 of the trailing edge processing part 50. The subtractors 47 and 57 subtract the offset amount from the sample value supplied from the ADCs 41 and 51 and then output the sample value in which the offset is adjusted. In the leading edge processing part 40, the sample value to be output from the subtractor 47, in which sample value the offset is adjusted, is supplied to the offset circuit 68 and also to the Viterbi decoder 43.

The offset detector 68 latches the moving average value of the sample value in the trailing edge of the reproduction signal as a reference level at a predetermined timing (refer to the flip flop 100 shown in FIG. 9). Then, the offset detector 68 feeds back the difference (refer to the subtractor 101 in FIG. 9) between the moving average value of the sample value in the trailing edge of the reproduction signal from the subtractor 47 and a latched reference level, as an offset amount. Consequently, from a subtractor 47, a value (sample value in which the offset is adjusted), in which an overall level fluctuation of the reproduction signal generated at the timing the reference level is latched as an offset value, is deducted from an actual sample value.

In the trailing edge processing part 50, the sample value output from the subtractor 57, in which sample value the offset is adjusted in the same method mentioned above, is supplied to the Viterbi decoder 53. Each of the Viterbi decoders 43 and 53 restores maximum likelihood data as record data based on a transition state of the sample value in which the offset is adjusted in accordance with a Viterbi decoding algorithm.

By such this configuration of the leading edge processing part 40 and the trailing edge processing part 50, for example, as shown in FIG. 19, even if the real sample value (refer to "○" (white round) mark) from the ADC 41 has offset by the rise of the overall level of the reproduction signal, the output from each of the subtractors 47 and 57 (for example, output (1) of the subtractor 47) is adjusted so that the sample value is a value corresponding to the reproduction signal waveform at the time the reference level is latched (refer to "●" (black round) mark).

In addition, in the second phase error calculating circuits 61 and 71 in the embodiment, it is not limited that the phase error amount is calculated based on the difference between the center value of the reproduction signal and the sample value in the edge of the reproduction signal. If the value (level) to originally be sampled from the reproduction signal is known in a predetermined clock phase beforehand, the phase error can be calculated based on the difference between the value (level) and the sample value actually obtained. In this case, the phase is adjusted so that the phase of the clock is locked by the predetermined clock phase.

In the above examples, the second phase error calculating circuits 65 and 75 correspond to phase error detecting parts, the offset detecting circuit 68 corresponds to an offset detecting part, the adder 63 corresponds to a reference level adjusting part, and the DACs 45 and 55 and the phase adjustment oscillation units 46 and 56 correpond to a phase adjusting part.

Moreover, the subtractor 91, the divider 92, the edge selecting circuit 93, the adder 94, and the flip flop 95 shown in FIG. 9 correspond to a monitor sample value generating part, the flip flops 96, 97 and 100, the AND circuit 98, the OR circuit 99 and the subtractor 101 shown in FIG. 9 correspond to an offset calculating part.

The offset calculating part may add a correction amount (positive or negative value) to the offset amount obtained by the offset calculating part. Alternatively, the offset calculating part may multiply the offset amount by a predetermined magnification, or may adjust in accordance with a predetermined relational expression.

The gain adjusting circuit 69 and the adder 64 shown in FIG. 2 correspond to an offset adjusting part (refer to claim 3).

The first phase error calculating circuits 61 and 71 correspond to a part detecting the phase error amount based on a change of the plurality of the sample values, and the output control circuits 67 and 77, which operate based on the phase error switching signal from the control unit 200, correspond to a phase error switching control part.

The offset detecting circuit 68 corresponds to an averaging part (refer to claim 6). An averaging approach conducted by the averaging part is not specifically limited. The monitor edge sample value, in which the overall characteristic of the plurality of sample values is considered, can be obtained by the averaging part.

The edge selecting circuit 93 shown in FIG. 9 corresponds to a sample value selecting part. For example, in a case in which a monitor sample value is the moving average value of a predetermined number of the sample values, one sample value, which is closer to the monitor sample value, is selected by the sample value selecting part.

Furthermore, the edge selection logic circuit 934 shown in FIG. 11 corresponds to a sample value selecting part (refer to claim 7).

In addition, the leading edge processing part 40 corresponds to a first processing part and the trailing edge processing part 50 corresponds to a second processing part. And a path from the offset detecting circuit 68 of the phase error amount detecting part 44 of the leading edge processing part 40 to the adder 74 of the phase error amount detecting part 54 of the trailing edge processing part through the gain adjusting circuit 69 corresponds to a part supplying the offset amount obtained by the offset calculating part to the second processing part.

The subtractors 47 and 57 shown in FIG. 18 correspond to an offset adjusting part (refer to claim 12).

As mentioned above, according to the present invention, since the reference level in the phase error detecting part is adjusted based on the offset amount, a more proper phase error amount can be obtained even if the overall level of the reproduction signal fluctuates. Consequently, it is possible to realize the clock adjusting device which can perform a stable phase adjustment based on the phase error amount.

Moreover, according to the present invention, it is possible to realize the offset detecting device which can be used for such the clock adjusting device.

Furthermore, according to the present invention, it is possible to realize the data reproducing apparatus in which the offset detecting device is applied.

The present invention is not limited to the specifically disclosed embodiments, variations and modifications, and other variations and modifications may be made without departing from the scope of the present invention.

The present application is based on Japanese Priority Application No.2001-165589 filed on May 31, 2001, the entire contents of which are hereby incorporated by reference.

What is claimed is:

1. A clock adjusting device for use with a data reproducing apparatus which samples a reproduction signal from a recording medium synchronizing with a predetermined clock and restores data in accordance with a maximum-likelihood decode algorithm corresponding to a record rule of a partial response using a sample value, said clock adjusting device comprising:

a phase error detecting part detecting a phase error amount of a lock based on a change state of said sample value at a first edge of said reproduction signal on a basis of a reference level;

an offset detecting part detecting an offset amount of said reproduction signal;

a reference level adjusting part adjusting said reference level use by said phase error detecting part based on said offset amount detected by said offset detecting part; and a phase adjusting part adjusting a phase of said clock based on said phase error amount detected by said phase error detecting part, wherein said offset detecting part comprises:

a monitor sample value generating part generating a monitor edge sample value based on said sample value at a second edge being an opposite side edge to said first edge of said reproduction signal; and an offset calculating part for calculating, as an offset amount, a change amount of said monitor edge sample value generated by said monitor sample value generating part based on said monitor edge sample value obtained at a predetermined timing.

2. The clock adjusting device as claimed in claim 1, wherein said first edge is a leading edge of said reproduction signal, and said second edge is a trailing edge of said reproduction signal.

3. The clock adjusting device as claimed in claim 2, comprising an offset adjusting part adjusting an offset amount obtain by said offset calculating part, wherein said reference level adjusting part adjusts said reference level used by said phase error detecting part based on said offset amount adjusted by said offset adjusting part.

4. The clock adjusting device as claimed in claim 1, comprising:

a part detecting said phase error amount based on said change state of a plurality of sample values; and a phase error switching control part controlling said phase adjusting part so that said phase of said clock is adjusted based on said phase error amount obtained by said phase error detecting part after said phase of said clock is adjusted based on said phase error amount detected by said part.

5. An offset detecting device for detecting an offset of a reproduction signal in a data reproducing apparatus that said reproduction signal from a recording medium is sampled synchronizing with a predetermined clock and data is restored using a sample value in accordance with a maximum-likelihood decode algorithm corresponding to a record rule of a partial response, said offset detecting device comprising:

a monitor sample value generating part for generating a monitor edge sample value based on said sample value at a second edge being an opposite side edge of a first edge of said reproduction signal when said reproduction signal is sampled synchronizing with said clock which phase is adjusted to said firs edge of said reproduction signal; and an offset calculating part calculating, as an offset amount of a reproduction signal, a change amount of said monitor edge sample value generated by said sample value generating part on a basis of said monitor edge sample value obtained at a predetermined timing.

6. The offset detecting device as claimed in claim 5, wherein said monitor sample value generating part comprises an averaging part averaging a plurality of sample values at said second edge and generating said monitor edge sample value.

7. The offset detecting device as claimed in claim 5, wherein said monitor sample value generating art comprises a sample value selecting part selecting two sample values that are used a generate said monitor edge sample value when said two sample values are continuously obtained as a sample value at said second edge.

8. The offset detecting device as claimed in claim 7, wherein said sample value selecting part selects one of said two sample values, in which a change of said monitor edge sample value becomes smaller, to be used a generate said monitor sample value.

9. The offset detecting device as claimed in claim 7, wherein said sample value selecting part selects one of said two sample values, which is obtained at an earlier timing, to be used to generate said monitor sample value.

10. The offset detecting device as claimed in claim 7, wherein said sample value selecting part selects one of said two sample values, which is obtained at a later timing, to be used to generate said monitor sample value.

11. An apparatus for reproducing data, comprising:

a first processing part sampling a reproduction signal synchronizing with a first clock which phase is adjusted to a first edge of said reproduction signal from a recording medium, and restoring data in accordance with a maximum-likelihood decode algorithm corresponding to a record rule of a partial response by using a first same value; and a second processing part sampling said reproduction signal synchronizing with a second clock which phase is adjusted to a second edge being an opposite side edge of said first edge of said reproduction signal, and restoring data in accordance with said maximum-likelihood decode algorithm by using a second sample value, wherein said first processing part comprises:

a monitor sample value generating part generating a monitor edge sample value based on said second sample value at said second edge of said reproduction signal;

an offset calculating part calculating, as an offset amount, a change amount of said monitor edge sample value generated by said sample value generating part based on said monitor edge sample value obtained at a predetermined timing; and a part supplying said offset amount obtained by said offset calculating part to said second processing part, so that said first processing part and said second processing part restore data based on said reproduction signal and said offset amount.

12. The apparatus as claimed in claim 11, herein each of said first processing part and said second processing part comprises an offset adjusting part adjusting said first sample value or said second sample value based on said offset amount.

13. The apparatus as claimed in claim 12, wherein each of said first processing part and said second processing art comprises a phase error detecting part detecting a phase error amount of said first clock or said second clock for sampling said reproduction signal based on said offset amount, and adjusts a phase of said first clock or said second clock base on said phase error amount by said phase error detecting part.

* * * * *